(12) United States Patent
Ramamurthy et al.

(10) Patent No.: US 12,155,205 B2
(45) Date of Patent: Nov. 26, 2024

(54) ENERGY TRANSFER USING HIGH-PRESSURE VESSEL

(71) Applicant: Energy Internet Corporation, Saratoga, CA (US)

(72) Inventors: Shankar Ramamurthy, Saratoga, CA (US); Ashok S Krishna, Danville, CA (US)

(73) Assignee: Energy Internet Corporation, Saratoga, CA (US)

( * ) Notice: Subject to any disclaimer, the term of this patent is extended or adjusted under 35 U.S.C. 154(b) by 310 days.

(21) Appl. No.: 17/351,523

(22) Filed: Jun. 18, 2021

(65) Prior Publication Data

US 2021/0313835 A1    Oct. 7, 2021

Related U.S. Application Data

(63) Continuation-in-part of application No. 16/857,854, filed on Apr. 24, 2020, now abandoned, which is a
(Continued)

(51) Int. Cl.
*H02J 15/00* (2006.01)
*F17C 13/00* (2006.01)

(52) U.S. Cl.
CPC .......... *H02J 15/006* (2013.01); *F17C 13/002* (2013.01); *F17C 2227/0142* (2013.01); *F17C 2227/0348* (2013.01); *F17C 2250/032* (2013.01); *F17C 2265/07* (2013.01); *H02J 2300/20* (2020.01)

(58) Field of Classification Search
CPC .... H02J 15/006; H02J 2300/20; H02J 15/003; F17C 13/002; F17C 2227/0142; F17C 2227/0348; F17C 2250/032; F17C 2265/07; F17C 2270/0581; G06Q 50/06
See application file for complete search history.

(56) References Cited

U.S. PATENT DOCUMENTS 5,934,076 A    8/1999    Coney
7,821,158 B2   10/2010   Vandor
(Continued)

FOREIGN PATENT DOCUMENTS

WO    WO2015123784 A1    8/2015

*Primary Examiner* — Ziaul Karim
(74) *Attorney, Agent, or Firm* — Adams Intellex, PLC

(57) ABSTRACT

Disclosed techniques include energy transfer using high-pressure vessels. Liquid is pumped into a high-pressure vessel to pressurize a gas. The gas can include air. Liquid is sprayed into the high-pressure vessel to cool the gas. Heat exchange is performed to cool the liquid before spraying the liquid into the high-pressure vessel. The spraying liquid into the top and the bottom of the high-pressure vessel is accomplished using nozzles in a top portion and nozzles in a bottom portion of the high-pressure vessel. The pressurized gas is transferred into a storage reservoir. The storage reservoir can include an underground cavern or aquifer. Gas from the storage reservoir is delivered to drive a turbine to recover stored energy. The extracting gas from the storage reservoir is accomplished using an additional high-pressure vessel. Heat exchange is performed to warm the liquid before spraying the liquid into the additional high-pressure vessel.

25 Claims, 12 Drawing Sheets

Related U.S. Application Data continuation-in-part of application No. 16/747,843, filed on Jan. 21, 2020, now abandoned, which is a continuation-in-part of application No. 16/378,243, filed on Apr. 8, 2019, now Pat. No. 10,947,899, which is a continuation-in-part of application No. 16/118,886, filed on Aug. 31, 2018, now Pat. No. 10,725,441.

(60) Provisional application No. 63/178,560, filed on Apr. 23, 2021, provisional application No. 63/152,357, filed on Feb. 23, 2021, provisional application No. 63/110,417, filed on Nov. 6, 2020, provisional application No. 63/048,032, filed on Jul. 3, 2020, provisional application No. 63/047,188, filed on Jul. 1, 2020, provisional application No. 62/981,629, filed on Feb. 26, 2020, provisional application No. 62/916,449, filed on Oct. 17, 2019, provisional application No. 62/838,992, filed on Apr. 26, 2019, provisional application No. 62/795,133, filed on Jan. 22, 2019, provisional application No. 62/795,140, filed on Jan. 22, 2019, provisional application No. 62/784,582, filed on Dec. 24, 2018, provisional application No. 62/679,051, filed on Jun. 1, 2018, provisional application No. 62/654,718, filed on Apr. 9, 2018, provisional application No. 62/654,859, filed on Apr. 9, 2018.

(56) References Cited

U.S. PATENT DOCUMENTS

| | | | |
|---|---|---|---|
| 7,870,746 B2 | 1/2011 | Vandor | |
| 8,020,404 B2 | 9/2011 | Vandor | |
| 8,063,511 B2 | 11/2011 | Vandor | |
| 9,260,018 B2 | 2/2016 | Vandor | |
| 9,540,957 B2 | 1/2017 | Shinnar et al. | |
| 9,562,183 B2 | 2/2017 | Hidalgo et al. | |
| 9,568,235 B2 | 2/2017 | Dobbs | |
| 9,631,846 B2 | 4/2017 | Chen et al. | |
| 9,651,030 B2 | 5/2017 | Kim et al. | |
| 9,664,140 B2 | 5/2017 | Kalika | |
| 10,563,621 B2 | 2/2020 | Pages | |
| 2003/0036806 A1 | 2/2003 | Schienbein et al. | |
| 2008/0046387 A1 | 2/2008 | Gopal et al. | |
| 2008/0071705 A1 | 3/2008 | Enis et al. | |
| 2008/0172279 A1 | 7/2008 | Enis et al. | |
| 2009/0200805 A1 | 8/2009 | Kim et al. | |
| 2009/0226308 A1 | 9/2009 | Vandor | |
| 2009/0282840 A1 | 11/2009 | Chen et al. | |
| 2009/0319090 A1 | 12/2009 | Dillon et al. | |
| 2010/0308765 A1 | 12/2010 | Moore et al. | |
| 2010/0329903 A1* | 12/2010 | Fong | F15B 1/265 137/12 |
| 2011/0079010 A1* | 4/2011 | McBride | F03G 6/071 60/641.1 |
| 2011/0259442 A1* | 10/2011 | McBride | F15B 1/027 137/334 |
| 2011/0283690 A1* | 11/2011 | Bollinger | F03G 7/04 60/327 |
| 2011/0296822 A1* | 12/2011 | Bollinger | F15B 1/04 60/327 |
| 2012/0047884 A1* | 3/2012 | McBride | F01K 27/00 60/398 |
| 2012/0053737 A1 | 3/2012 | Valluri et al. | |
| 2013/0091836 A1* | 4/2013 | McBride | F02G 1/043 60/410 |
| 2013/0152572 A1* | 6/2013 | Madderno | F04B 9/1256 60/413 |
| 2013/0168961 A1 | 7/2013 | Stahlkopf et al. | |
| 2013/0336721 A1* | 12/2013 | McBride | F17C 1/007 405/55 |
| 2014/0039710 A1 | 2/2014 | Carter et al. | |
| 2014/0129042 A1 | 5/2014 | Miner | |
| 2014/0172182 A1 | 6/2014 | Subbotin et al. | |
| 2015/0033724 A1 | 2/2015 | Fong et al. | |
| 2015/0143806 A1 | 5/2015 | Friesth | |
| 2015/0192358 A1 | 7/2015 | Morgan et al. | |
| 2015/0198185 A1* | 7/2015 | Le Roux | F15B 15/06 92/68 |
| 2016/0047597 A1 | 2/2016 | Brett et al. | |
| 2016/0207703 A1 | 7/2016 | Elazari-Volcani | |
| 2016/0336928 A1 | 11/2016 | Kuznetsov | |
| 2017/0005515 A1 | 1/2017 | Sanders | |
| 2017/0038157 A1 | 2/2017 | O'Donnell et al. | |
| 2017/0044414 A1 | 2/2017 | Sutterlin et al. | |
| 2017/0067667 A1 | 3/2017 | Choi | |
| 2017/0082060 A1 | 3/2017 | Kalika | |
| 2017/0082123 A1 | 3/2017 | Momen et al. | |
| 2017/0082380 A1 | 3/2017 | Gauche et al. | |
| 2017/0159495 A1 | 6/2017 | Laughlin et al. | |
| 2019/0003425 A1 | 1/2019 | Pages | |
| 2019/0056174 A1 | 2/2019 | Ragot et al. | |
| 2020/0400372 A1 | 12/2020 | Castellucci et al. | |

\* cited by examiner

ENERGY TRANSFER USING HIGH-PRESSURE VESSEL

RELATED APPLICATIONS

This application claims the benefit of U.S. provisional patent applications "Energy Transfer Using High-Pressure Vessel" Ser. No. 63/047,188, filed Jul. 1, 2020, "Controlled Liquefaction Using Compatible Materials for Energy Management" Ser. No. 63/048,032, filed Jul. 3, 2020, "Control of Software Defined Mechanical Machines Using Description Language" Ser. No. 63/110,417, filed Nov. 6, 2020, "Energy Storage and Buffering Using Multiple Pressure Containers" Ser. No. 63/152,357, filed Feb. 23, 2021, and "Gas Liquefaction Using Hybrid Processing" Ser. No. 63/178,560, filed Apr. 23, 2021.

This application is also a continuation-in-part of U.S. patent application "Energy Transfer Through Fluid Flows" Ser. No. 16/857,854, filed Apr. 24, 2020, which claims the benefit of U.S. provisional patent applications "Energy Transfer Through Fluid Flows" Ser. No. 62/838,992, filed Apr. 26, 2019, "Desalination Using Pressure Vessels" Ser. No. 62/916,449, filed Oct. 17, 2019, and "Controlled Liquefaction and Energy Management" Ser. No. 62/981,629, filed Feb. 26, 2020.

The U.S. patent application "Energy Transfer Through Fluid Flows" Ser. No. 16/857,854, filed Apr. 24, 2020 is also a continuation-in-part of U.S. patent application "Energy Management Using a Converged Infrastructure" Ser. No. 16/747,843, filed Jan. 21, 2020, which claims the benefit of U.S. provisional patent applications "Energy Management Using a Converged Infrastructure" Ser. No. 62/795,140, filed Jan. 22, 2019, "Energy Management Using Electronic Flywheel" Ser. No. 62/795,133, filed Jan. 22, 2019, "Energy Transfer Through Fluid Flows" Ser. No. 62/838,992, filed Apr. 26, 2019, and "Desalination Using Pressure Vessels" Ser. No. 62/916,449, filed Oct. 17, 2019.

The U.S. patent application "Energy Management Using a Converged Infrastructure" Ser. No. 16/747,843, filed Jan. 21, 2020 is also a continuation-in-part of U.S. patent application "Energy Storage and Management Using Pumping" Ser. No. 16/378,243, filed Apr. 8, 2019, which claims the benefit of U.S. provisional patent applications "Modularized Energy Management Using Pooling" Ser. No. 62/654,718, filed Apr. 9, 2018, "Energy Storage and Management Using Pumping" Ser. No. 62/654,859, filed Apr. 9, 2018, "Power Management Across Point of Source to Point of Load" Ser. No. 62/679,051, filed Jun. 1, 2018, "Energy Management Using Pressure Amplification" Ser. No. 62/784,582, filed Dec. 24, 2018, "Energy Management Using a Converged Infrastructure" Ser. No. 62/795,140, filed Jan. 22, 2019, and "Energy Management Using Electronic Flywheel" Ser. No. 62/795,133, filed Jan. 22, 2019.

The U.S. patent application "Energy Storage and Management Using Pumping" Ser. No. 16/378,243, filed Apr. 8, 2019, is also a continuation-in-part of U.S. patent application "Energy Management with Multiple Pressurized Storage Elements" Ser. No. 16/118,886, filed Aug. 31, 2018, which claims the benefit of U.S. provisional patent applications "Energy Management with Multiple Pressurized Storage Elements" Ser. No. 62/552,747, filed Aug. 31, 2017, "Modularized Energy Management Using Pooling" Ser. No. 62/654,718, filed Apr. 9, 2018, "Energy Storage and Management Using Pumping" Ser. No. 62/654,859, filed Apr. 9, 2018, and "Power Management Across Point of Source to Point of Load" Ser. No. 62/679,051, filed Jun. 1, 2018.

Each of the foregoing applications is hereby incorporated by reference in its entirety.

FIELD OF ART

This application relates generally to energy management and more particularly to energy transfer using high-pressure vessels.

BACKGROUND

The demand for energy worldwide is presently increasing at an ever-accelerating rate. Some countries are actively engaged in both reducing their energy demands and revamping their energy infrastructures, while others are constructing fossil fuel burning power plants, nuclear facilities, hydro dams, and other controversial or traditional sources of energy generation. This continually increasing demand for energy is propelled by the growth of municipalities, counties, states, and countries, and the development of rural or previously underserved areas. The demand is further rooted in improved standards of living and the ensuing widespread use of household appliances and personal electronic devices. The increases in the living standards, particularly in rural areas, has required both the installation of electrical and communications infrastructures and the expansion of transportation networks. Growing populations cause a further demand for energy as more people consume energy for cooking, bathing, cleaning, laundry, and entertaining. Energy is additionally consumed for illuminating, heating, and cooling houses or apartments, businesses, and government buildings. Other increases in energy demand directly result from expanded economic activities including retail, public transportation, and manufacturing, among many others.

Government agencies, energy producers, and thrifty or responsible energy consumers are motivated to initiate, practice, and enforce energy conservation measures. Consumers can decrease their energy footprints by lowering the thermostat in winter or increasing the thermostat in summer; turning off lights when leaving a room; and purchasing energy-efficient appliances, electronic consumer products, and automobiles. Each of these simple tasks is a popular step toward reducing cost through energy conservation. While these and other concerted conservation efforts can help, the demand for energy of all types continues to increase beyond the savings which are solely attributable to conservation. The growth of towns, cities, states, and countries increases the demand for energy of all kinds, resulting in what many analysts identify as an energy crisis. Thus, increasing energy demand has many dimensions. Increased demand and overconsumption of energy has imposed strains on natural resources ranging from fossil fuels to renewables such as wood chips, resulting in fuel shortages and increased environmental destruction and pollution.

The distribution of energy from generation sources to sinks or loads has been identified as a persistent hindrance to solving the energy crisis. The existing energy distribution infrastructure is at capacity and often unavailable to potential new energy sources including renewable energy. Further, aging energy generation equipment is unable to provide for the increased energy demands. Renewable energy options remain largely unexplored or underdeveloped, and there can be strong and vociferous resistance by adjacent landowners and others to siting of mountain or offshore windmills, solar farms, or wood burning plants. Even when designs can be drafted and permits obtained to construct renewable energy producing facilities, the distribution of the energy is impeded by the poor distribution infrastructure. Further, landowners are reluctant to agree to high tension lines that traverse their property, particularly when the power is destined for consumers "from away". Commissioning of new energy generation facilities remains a seemingly insurmountable challenge. Legal wrangling, construction delays, pollution mitigation requirements, crushing costs, or even war, have prevented, halted, or delayed new energy generation facilities from coming online. Energy loss and wastage remain major impediments. Further, aging appliances or manufacturing equipment, incandescent light bulbs, and poor building insulation and air sealing all waste energy in comparison to their modern counterparts.

To meet the many increases in energy demands, public officials at national, state, and local levels, plus city and regional planners, are compelled to decide among three broad energy solutions: to increase energy production by building new power plants, to reduce energy demand through energy conservation, or to implement a combination of both of these strategies. Another emerging energy production option is to implement energy generation based on renewable energy sources such as solar, wind, biofuels, geothermal, wave action, and so on. The primary limitation of many renewable energy sources remains that the sources do not produce consistent amounts of energy all day, every day. Solar energy only produces energy in the presence of light and produces varying amounts of energy depending on the intensity of the light hitting photovoltaic panels. Wind energy only produces energy when the wind is blowing. Energy generation sources and energy consumption demands must be balanced so that clean, reliable, and consistent energy is available at all times to all consumers throughout the country.

SUMMARY

Diverse and disparate energy generation sources can be used to produce energy such as electrical energy. Typically, multiple generation sources are required at any given time in order to address and meet differences between energy generation and energy demand. Further, energy production and energy consumption differences typically increase or decrease over a given period of time. These differences can further depend on a given timeframe such as day versus night, day of the week, manufacturing or processing schedules, seasonal factors such as heating or cooling demands, and so on. The difference between energy production and energy consumption can be considerable, and at particular times, mission critical. The difference can correlate to time-dependent energy demands such as changeable energy production capabilities due to the availability of a renewable resource used to generate the energy, night time lighting, the capacity of commercial or grid power, the amount of standby or backup energy available, etc. This energy consumption/production disparity can be addressed by storing energy, where available energy that exceeds demand at a given time is stored for later use. The stored energy can be accessed when demand exceeds a given level of available power. Further, renewable energy can be collected and stored when the renewable resource is available, when the available energy exceeds the needed energy, or even when the production cost of the energy is relatively inexpensive. The stored energy can be used to augment available energy or to provide the amount of energy that is needed during periods of increased or unmet energy requirement. The recovery of stored energy can be scaled. Stored energy recovery can be applied to low-level energy demand scenarios, such as the energy needs of a house or small farm operation, or to larger scale energy needs such as the energy needs for processing or manufacturing, or even to the largest energy requirements such as the energy needs for an energy distribution grid.

Disclosed techniques address energy transfer using high-pressure vessels for energy management. Pumping of a liquid into a high-pressure vessel is controlled to accomplish pressurizing a gas. Liquid is sprayed into the high-pressure vessel to cool the gas. The pressurized gas is provided into a storage reservoir. Gas from the storage reservoir is extracted to drive a turbine to recover stored energy. A computer-implemented method for energy management is disclosed comprising: pumping a first liquid into a high-pressure vessel, wherein the pumping is controlled to accomplish pressurizing a gas contained in the high-pressure vessel; spraying a second liquid into the high-pressure vessel, wherein the spraying a second liquid is used to cool the gas that is pressurized; transferring the pressurized gas from the high-pressure vessel to a storage reservoir, wherein the storage reservoir is isolatable from the high-pressure vessel; and delivering the pressurized gas from the storage reservoir to an energy recovery unit to extract work from the pressurized gas. In embodiments, the delivering gas from the storage reservoir is accomplished using an additional high-pressure vessel. The additional high-pressure vessel can include an expander. The additional high-pressure vessel can be located at ground level, below water, etc. The expanded gas pushes a column of liquid within the additional high-pressure vessel. In embodiments, the column of liquid within the additional high-pressure vessel in turn drives the turbine to recover the stored energy. Since compressing gas generates heat and expanded gas gives off heat, a liquid can be chilled to cool the compressing gas, and further liquid can be heated to heat the expanding gas.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1A:
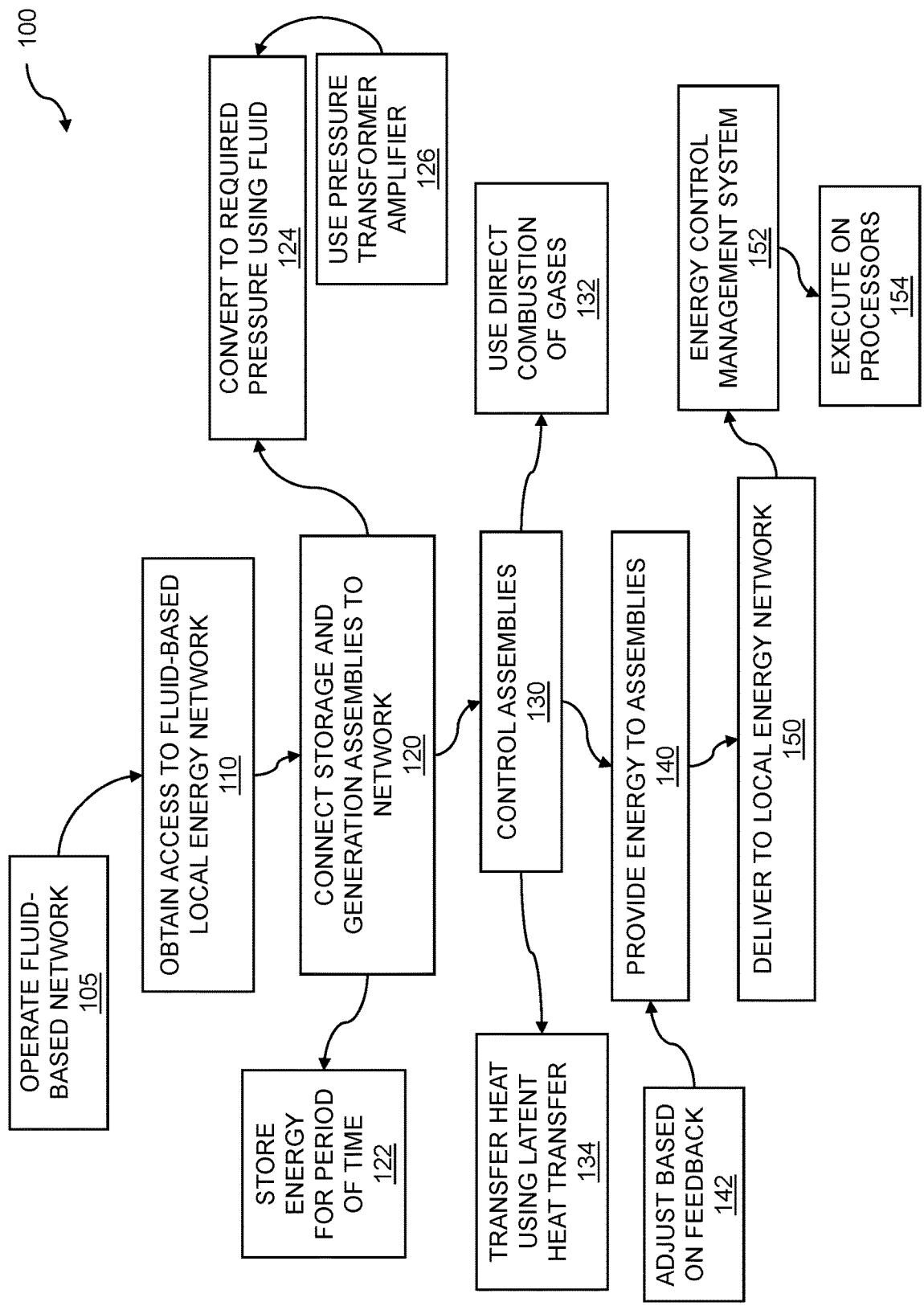
FIG. 1A is a flow diagram for energy management using energy transfer through fluid flows.

This disclosure provides techniques for energy management using high-pressure vessels. Many energy generation techniques are widely used to meet the daily energy demands large and small of individuals, households, small businesses, farms, manufacturing facilities, laboratories, governments, and so on. Traditional energy generation techniques have been based on burning fossil fuels, tapping natural resources such as hydro or geothermal sources, and so on. As energy usage has continued to expand, and energy consumers have continued to demand energy from alternative and renewable sources, energy generation has expanded to use techniques based on solar, wind, wave action, tidal action, biofuels, biogas, and so on. An obstacle to wider adoption of these and other renewable sources of energy is the intermittent nature of the sources. Windless days and nighttime hours affect energy generation based on wind and solar sources, respectively.

Energy with intermittent availability or energy in excess of present load requirements can be stored or cached when the energy is being produced and can be extracted and used at a later time for energy generation when the stored energy is needed. A similar strategy can be used based on price, where energy is stored when production cost is low, then later extracted when the energy production cost is high. The stored energy can be used in combination with other energy sources such as grid power or microgrid (local) power to meet energy demands at given times. Storage can include a period of time, where the period of time can be a short-term basis or a long-term basis. Regardless of energy conversion technique, energy losses are introduced when energy is converted from one energy type to another energy type. Further losses occur when storing energy, extracting energy, generating energy, routing energy, etc. Minimizing the energy losses is critical to any energy storage and retrieval or recovery technique. Electrical energy storage is possible based on mature technologies such as sealed lead acid (SLA) storage battery technologies, but the high costs of the immense battery banks required for such storage are prohibitive in terms of up-front investment and maintenance expenses. Further, batteries are problematic for long-term storage purposes because of charge leakage.

High-pressure vessels can be used to compress a gas within the vessel by pumping a liquid into the high-pressure vessel. Various types of liquids can be used to accomplish the compression. The liquids can include water, a specialized fluid such as Freon™, liquid air, liquid nitrogen, and so on. The compressed gas can be stored in a tank, an underwater bladder, unused oil infrastructure, and the like. The compressed gas can be stored in a storage reservoir such as an underground cavity, a cavern or an aquifer for example. The compressed gas can be stored for a time basis such as a short-term basis or a long-term basis. When the energy represented by the stored compressed gas is needed to meet scheduled energy needs, to meet energy shortfalls, etc., then the compressed gas can be extracted from the storage reservoir. However, the pressure at which the gas is stored can be too high to directly operate a piece of equipment such as a turbine. The gas that is extracted from the storage reservoir can be directed to an additional high-pressure vessel. Similar to the first high-pressure vessel, the additional high-pressure vessel can contain a gas that can be used to accomplish a gas pressure within the additional high-pressure vessel. The fluid within the additional high-pressure vessel can be used to spin the turbine to generate energy such as electrical energy.

Energy such as generated electrical energy can be stored as a compressed gas. The stored energy within the compressed gas can be later extracted by directly or indirectly spinning a turbine. The energy storage and extraction are most efficient when the pressurizing the gas is substantially isothermal. Substantially isothermal pressurizing or depressurizing of the gas can be accomplished by spraying a liquid into the high-pressure vessel. The injected liquid can be heated or cooled using heat exchangers to maintain substantially isothermal operation. The energy that is stored can be received from a wide diversity and disparity of energy sources. Energy can be stored when the amount of energy available from the points of generation exceeds the energy demand at the time of energy generation. The energy can be stored for a period of time. The energy storage can include gas-based energy storage using high-pressure vessels. The energy storage can include electrical energy storage using batteries or capacitors. The stored energy can be provided after a period of time to meet energy demands of current loads, dynamic loads, seasonal loads, and the like. Gas pressurized using high-pressure vessels can be stored in storage reservoirs for time bases including short-term and long-term bases. The storage and the extraction of the energy can be controlled by a processor-based energy management system. Managing the obtaining, connecting, providing, and delivering of energy is a complex and highly challenging task. Energy management can be influenced by many factors such as seasonal factors including the weather, variable energy generation pricing schemes, wildly varying energy demand, and so on. Energy management can be further complicated by an expanding energy customer base, quickly changing customer energy demands, requirements of service level agreements (SLAs), energy policies, etc. Despite the growing use of renewable energy resources such as solar, wind, wave action, tidal, geothermal, biogas, and the like, two significant challenges remain: the amount of energy produced by a given renewable energy source is highly variable, and the availability of the renewable energy source is inconsistent. As an example, wind energy is only available when wind is present, solar energy only when the sun is shining, wave action energy only when there is wave action, and so on.

In other disclosed techniques, energy management uses energy transfer through fluid flows. Energy can be obtained locally from a microgrid or farther afield using a grid. The energy can be derived from conventionally generated sources, renewable sources, etc., and can be stored. The stored energy can be used for energy generation at a later time. The energy can be generated using fuels such as coal, natural gas, or nuclear sources; using hydro power or geothermal energy; using renewable sources such as solar, wind, tidal, wave-action, biofuels or biogas; using pump-turbine sources such as compressed air, steam, or ice; using backup power sources such as diesel-generator (DG) sets; and so on. Access to a fluid-based local energy transfer distribution network is obtained. The energy transfer distribution can be based on one or more fluids, where the fluids can include water, liquid air, a specialty liquid such as Freon™, etc. The fluid-based local energy transfer distribution network can include at least two heterogeneous fluids. The energy transfer within the local energy transfer distribution network can be accomplished using multiple phases. The fluid-based local energy transfer distribution network can include a homogeneous fluid in liquid and gaseous phases.

One or more fluid-based energy storage and generation assemblies are connected to the fluid-based local energy transfer distribution network. The energy storage and generation assemblies can include multiple, parallel pipes to accommodate fluid expansion or compression. The multiple, parallel pipes can be organized into a hierarchy of parallel pipes. The energy storage and generation assemblies can include a pump-turbine and a pressure vessel. At least one of the one or more fluid-based energy storage and generation assemblies can include a pump running at an optimum performance-pressure point. The fluid-based energy storage and generation assemblies can be parts of a larger energy management system that can include a large-scale energy storage subsystem. The large-scale energy storage subsystem can store electrical energy, potential energy, thermal energy, kinetic energy, chemical energy, etc. Energy is provided to the one or more fluid-based energy storage and generation assemblies. The energy that is provided can include grid energy, microgrid energy, renewable energy, and so on. The providing the energy can be controlled by an energy control management system. The energy control management system can control fluid connections within the one or more fluid-based energy storage and generation assemblies. The controlling of the fluid connections can be accomplished with a flow controller module. The flow controller module can activate or disable pumps, open or close valves, etc. The controlling fluid connections can be performed by electrically controlled valves. The energy can be provided by actuating one or more valves.

Fluid-based energy from the energy storage and generation assemblies is delivered to the fluid-based local energy transfer distribution network. The delivering is based on an energy control management system executing on one or more processors. The delivering can include providing local fluid-based services, where the local fluid-based services supply local consumer applications. The consumer application can include a water nozzle, an air nozzle, a water Venturi function, an air Venturi function, a vacuum supply, space heating, a fluid-based rotation, space cooling, hot water, or cold water. The energy control management system uses supply profiles and demand profiles to adjust the delivering. The energy control management system provides valve control information to the one or more fluid-based energy storage and generation assemblies. The obtaining, the connecting, the providing, and the delivering comprise an energy internet converged infrastructure.

FIG. 1A is a flow diagram for energy management using energy transfer through fluid flows. Energy storage and management can be based on one or more assemblies, where the one or more assemblies can include fluid-based energy storage and generation assemblies. The fluid-based energy storage and generation assembly can include multiple, parallel pipes to accommodate fluid expansion or compression. The fluid can include water, liquid air, liquid nitrogen, and the like. The fluid can be used to compress a gas such as air or nitrogen, a specialty gas such as Freon™, and so on. The fluid can be used to move a liquid, such as by using the fluid to spin a pump-turbine. The pump-turbine can be used to move the liquid to create hydraulic head. The fluid in which energy is stored can be used to generate energy. The fluid can be used to spin a turbine, the pump-turbine, and the like. The fluid-based energy can include hot air, liquid air, cold air, or vacuum services. The fluid-based energy storage and generation assemblies can be parts of a large energy storage and generation subsystem. The energy storage and generation subsystem can include further assemblies for storing energy in other forms. The further energy storage and generation subsystems can include multiple batteries or capacitors, pressurized storage elements such as high-pressure water, pressurized air, steam, ice-water slurry, and the like.

Access to a fluid-based local energy transfer distribution network is obtained. The distribution network can include pipes within which fluids, gases, or phases (e.g., fluid and gas) can be contained. One or more fluid-based energy storage and generation assemblies are connected to the fluid-based local energy transfer distribution network. In embodiments, the energy storage and generation assemblies can include multiple, parallel pipes to accommodate fluid expansion or compression. The parallel pipes can include pipes with substantially similar dimensions or pipes with substantially dissimilar dimensions. The parallel pipes can be organized in various configurations. In embodiments, the multiple, parallel pipes are configured in a hierarchy. The hierarchy can include ratios between pipes within the hierarchy. In embodiments, the hierarchy can include 2-to-1 piping for compression or 1-to-2 piping for expansion. The hierarchy can include various levels of hierarchy. In embodiments, the hierarchy comprises no more than seven levels to achieve at least 100 times pressure expansion or contraction. Energy is provided to the one or more fluid-based energy storage and generation assemblies. The energy can be provided from grid energy, renewable energy, and the like. Fluid-based energy from the energy storage and generation assemblies is delivered to the fluid-based local energy transfer distribution network, where the delivering is based on an energy control management system executing on one or more processors. The delivering can include providing local fluid-based services. The delivering can include providing a fluid-based equivalent mechanical range of motion through fluid transfer.

A flow 100 for energy management using energy transfer through fluid flows is shown. The fluid flows can be accomplished using multiple, parallel pipes. The pipes can be used to accommodate fluid expansion or compression. Energy, such as electrical energy obtained from a traditional electrical grid, energy from renewable sources, locally generated energy, gas or diesel generated electrical energy, and so on, can be stored and used for energy generation. Other forms of energy including thermal energy, mechanical energy, kinetic energy, pressure, etc. can be stored. The energy can be transformed into an energy format which can be stored for a length of time, where the length of time can include a short-term basis, a long-term basis, etc. Energy management can be based on one or more energy control policies, energy production costs, service level agreements, energy needs, and the like. An energy management policy can be used for storing, retrieving, generating, or extracting energy from an energy storage assembly. The energy storage assembly can be a large-scale energy storage assembly or a small-scale energy storage assembly.

The flow 100 includes operating a fluid-based energy transfer distribution network 105. Described below, the fluid-based energy transfer distribution network can use one or more fluids or one or more phases (e.g., liquid, gas) for energy transfer. While fluid-based energy storage and generation assemblies are discussed throughout, the energy storage assemblies further can be based on battery storage, capacitor storage, inductive storage, compressed air storage, steam or ice storage, ice-water slurry, and so on. Storage can include use of chemical, methane, or some other type of storage. While energy storage and generation assemblies comprising multiple, parallel pipes are described, the energy storage assemblies can include a pump-turbine and pressure vessel assembly. The pressure vessel can include energy storage elements such as high-pressure chambers, compression-expansion chambers, compressed air chambers, and so on. The pressure vessels can be located above ground, below ground, submerged in water, etc. The pressure vessels can include unused oil infrastructure such as unused or nonproductive oil well infrastructure, unused salt caverns, aquifers, large cavities underground, or porous rock structures capable of holding air or water under pressure. The storage elements of an energy storage and generation assembly can store various types of energy including electrical energy, thermal energy, kinetic energy, mechanical energy, hydraulic energy, and so on.

The flow 100 includes obtaining access to a fluid-based local energy transfer distribution network 110. The local energy transfer distribution network can include pipes of various dimensions. Fluids can be moved into the pipes, out of the pipes, through the pipes, and so on. A pump-turbine can be used for moving fluid through the local energy transfer distribution network. The pump-turbine can include a pump-turbine subassembly or a pump subassembly and a turbine subassembly. The pump-turbine can consume energy such as electrical energy to spin the turbine. The pump-turbine can be used to move a fluid such as water, liquid air, liquid nitrogen, and so on, where the water or other fluid can be used to pressurize the pressure vessel. The fluid, gas, etc. can spin the turbine of the pump-turbine, which in turn can spin the pump. In embodiments, the pump can be used to generate energy such as electrical energy. In embodiments, the pump-turbine can be used to convert energy such as electrical energy to a fluid-based energy that can be stored. The fluid-based energy can include pressure, flow, hydraulic head, etc. In embodiments, the fluid of the one or more fluid-based energy storage and generation assemblies can include liquid air. The fluid can further include water such as ambient water, treated water, etc.

The flow 100 includes connecting one or more fluid-based energy storage and generation assemblies to the fluid-based local energy transfer distribution network 120. The fluid-based local energy transfer distribution network can be part of an energy transfer distribution system. In embodiments, the local energy transfer distribution system can include a microgrid. Various types of fluid-based energy storage and generation assemblies can be used. In embodiments, the energy storage and generation assemblies can include multiple, parallel pipes to accommodate fluid expansion or compression. The multiple, parallel pipes can include dimensions that are substantially similar or substantially different. Fluid expansion or compression within the multiple, parallel pipes can be accomplished using a pump, a pump-turbine, etc. In embodiments, the one or more fluid-based energy storage and generation assemblies include storing energy for a period of time 122. The period of time for which the energy can be stored can be based on a variety of factors such as when or where the energy is produced, by what means the energy is produced, a possible use for the energy, and the like. In embodiments, the period of time can be a short-term basis. Storing energy for a short-term basis can include storing energy as electrical energy in capacitors, chemical energy in batteries, etc. The storing energy for a short-term basis can include storing energy using a fluid-based energy storage and generation assembly. In embodiments, the short-term basis can be an integer number of seconds, minutes, hours, or days, where the integer number of seconds, minutes, hours, or days comprises a length of time substantially less than one week. The energy storage can include other periods of time. In embodiments, the period of time is a long-term basis. A long-term basis can include storing energy such as thermal energy collected during hot months for use during cold months. In embodiments, the long-term basis can be an integer number of weeks, months, seasons, or years, wherein the integer number of weeks, months, seasons, or years comprises a length of time substantially more than one day.

In embodiments, at least one of the one or more fluid-based energy storage and generation assemblies includes a pump running at an optimum performance-pressure point. The pump can include a standalone pump, a pump-turbine, and so on. The optimum performance-pressure point can be determined by design, by monitoring pump performance during operation, and so on. Further embodiments include converting the pump optimum performance-pressure point pressure to a required pressure within the fluid-based local energy transfer distribution system 124. An optimum performance-pressure point pressure of a given pump may be different from a fluid pressure required for storing energy. The optimum performance-pressure point pressure can be converted. In embodiments, optimum performance-pressure point pressure is converted using a pressure transformer amplifier 126. Pressure conversion can be accomplished using a variety of techniques. In embodiments, the pressure transformer amplifier uses two or more pressure amplification pipes.

The one or more fluid-based energy storage and generation assemblies can be controlled. The controlling of the assemblies can include software control. The software control can be used to implement a variety of functions. The flow 100 further includes controlling the one or more fluid-based energy storage and generation assemblies 130. The controlling can be used to implement various functions. In embodiments, the controlling can implement a compressor function, an expander function, or a heat exchanger function. The controlling can include adding heat to prevent freezing during expansion, extracting heat to provide cooling during compression, and so on. In the flow 100, the controlling can provide heat during expansion through direct combustion of a gas 132. The gas can include natural gas, propane, butane, biogas, and so on. In embodiments, the heat exchanger function can enable recovering waste heat through a waste-heat recovery subsystem. The recovering waste heat can occur during compression. In the flow 100, the controlling can transfer heat using latent heat transfer 134. The latent heat transfer can include capturing heat released during a change of phase. A change of phase can include changing a liquid such as water to a gas such as water vapor or steam. In other embodiments, the controlling provides a cold-water spray to provide cooling during compression. To counteract cooling during expansion, the control can include various techniques. In embodiments, the controlling provides a hot water spray to add heat during expansion. Under certain usage conditions, the heat introduced by the hot water spray may not provide enough thermal energy to counteract the cooling effect of expansion such as rapid or prolonged expansion. Between cooling and heating, a fluid temperature can be maintained. In embodiments, the controlling enables isothermal operation of the one or more fluid-based energy storage and generation assemblies.

The flow 100 includes providing energy to the one or more fluid-based energy storage and generation assemblies 140. The energy that is provided can include fluid energy, chemical energy, mechanical energy, kinetic energy, and so on. In embodiments, the providing includes using electrical energy. The electrical energy can be used to drive a pump, a pump-turbine, etc. The electrical energy that is provided can include grid energy, microgrid (locally generated) energy, renewable energy, and the like. The amount of energy that can be provided to the one or more fluid-based energy storage and generation assemblies can vary due to an amount of available energy, available energy sources, energy loads, etc. Further embodiments include adjusting the providing based on feedback 142 to the energy control management system. The feedback can include data such as status data, operating data, etc. Status data can include pressure levels, electrical charge levels, and the like. Operating data can include status of the one or more fluid-based energy storage and generation assemblies, maintenance data, offline data, and so on. In embodiments, the feedback includes energy supply or energy demand updates. The energy supply or energy demand updates can be supplied automatically, can be based on service level agreements, can include seasonal adjustments, etc. The load information can be based on instantaneous load (dL/dt), estimated load, seasonally adjusted load, weather-based factors, and the like. The load information can be articulated in a service level agreement in which a level of electrical energy delivery is required. In embodiments, the energy control management system is driven by an energy control policy. The energy control policy can be based on cost of energy production, mean time to failure (MTTF) predictions for assemblies within the energy storage and generation subsystem, contractual obligations for levels of energy delivery, etc. In embodiments, the energy control policy changes dynamically. The dynamic changes to the energy control policy can be based on equipment failure, unanticipated load requirements, emergency situations such as a natural disaster or emergency maintenance, etc.

The flow 100 includes delivering fluid-based energy from the energy storage and generation assemblies to the fluid-based local energy transfer distribution network 150. The fluid-based energy can be delivered using a variety of delivery techniques. In embodiments, the delivering includes providing local fluid-based services. The local fluid-based services can include domestic services, commercial or manufacturing services, governmental services, and the like. In embodiments, the local, fluid-based services can supply local consumer applications. Various types of fluid-based services can be supplied. In embodiments, the local, consumer applications can include a water nozzle, an air nozzle, a water Venturi function, an air Venturi function, a vacuum supply, space heating, a fluid-based rotation, space cooling, hot water, or cold water. The delivering can provide other functions or services. In embodiments, the delivering can include providing a fluid-based equivalent mechanical range of motion through fluid transfer. The fluid-based equivalent mechanical range of motion can include operating an activator, pushing or pulling a piston, controlling valves, controlling flow such as fluid flow, etc. In a usage example, the fluid flow for mechanical or machine range of motion can replace mechanical systems, such as mechanical valves that can be driven by one or more motors such as an electrical motor, with software-controlled apparatuses based on fluid flow. In embodiments, the equivalent mechanical range of motion can control fluid mixing. The rate of fluid flow can be adjusted. In further embodiments, the equivalent mechanical range of motion can control fluid velocity. Other fluid parameters can be controlled by the equivalent mechanical range of motion. In other embodiments, the equivalent mechanical range of motion can control fluid rotation. As discussed throughout, delivering energy by the fluid-based local energy transfer distribution network can be controlled.

In the flow 100, the delivering is based on an energy control management system 152. The energy control management system can be software controlled. In embodiments, the energy control management system can use supply profiles and demand profiles to adjust the delivering. The energy control management system can respond to real-time operating data. The energy control management system can use one or more service level agreements. In embodiments, the energy control management system controls electrical connections between the one or more fluid-based energy storage and generation assemblies and the energy grid. The electrical grid can include a micro-grid or onsite grid, a local grid, a regional grid, a national grid, and so on. In embodiments, the energy control management system can be driven by an energy control policy. The energy control policy can include policies based on energy availability, energy demands, seasonal adjustments, energy use priorities, etc. The energy control policy can be static, determined by agreement such as a service level agreement, and so on. In embodiments, the energy control policy changes dynamically. The flow 100 includes executing on one or more processors 154. The processors can include electronic controllers, microcontrollers, microcomputers, servers, and the like. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 1B:
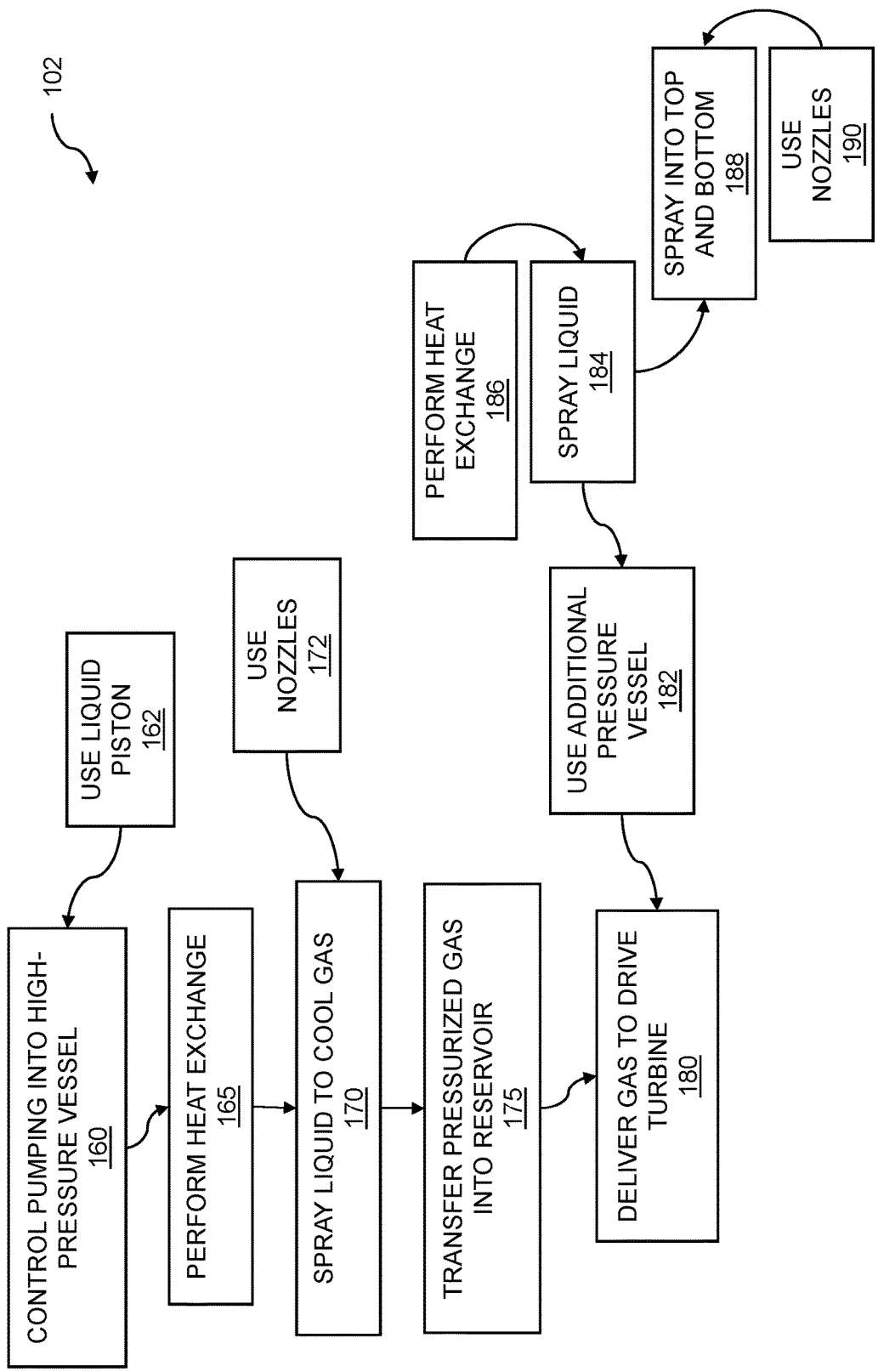
FIG. 1B is a flow diagram for energy transfer using high-pressure vessels.

FIG. 1B is a flow diagram for energy transfer using high-pressure vessels. A flow 102 for energy management based on energy transfer using high-pressure vessels is shown. A high-pressure vessel can be used to compress a gas such as air. The gas can be compressed using a pump to a pressure such as 50 bar, then can be further compressed to a pressure such as 200 bar within the high-pressure vessel. The high-pressure vessel can contain a highly compressed gas such as air, a liquid such as liquid air, liquid nitrogen, a refrigerant, and so on. The contents of the high-pressure vessel can be stored within a storage reservoir, where the storage reservoir can include an underground cavity such as a cavern, an aquifer, a non-functioning oil well, and the like. The contents of the storage reservoir can be extracted to an additional high-pressure reservoir. The contents of the additional high-pressure reservoir can be used to drive a turbine to recover the energy that was stored. Recall that a gas that is being compressed emits heat, and a gas that is being expanded absorbs heat. To control the excess heat of compression, or the "excess cold" of expansion, a liquid can be sprayed into the high-pressure vessels. The spraying can be accomplished using nozzles within the high-pressure vessels, where the nozzles are positioned on opposing sides of the vessels. The opposing sides can include top and bottom sides or left and right sides. By cooling the gas under compression or heating the gas under expansion, the pressurizing or depressurizing of the gas can be substantially isothermal.

The flow 102 includes controlling pumping of a liquid into a high-pressure vessel 160 to accomplish pressurizing a gas. The pump can include an electrically operated pump, a pump within a pump-turbine, and so on. The pump can used to move a fluid such as water, liquid air, liquid nitrogen, a refrigerant, and so on, where the water or other fluid can be used to pressurize the high-pressure vessel. In embodiments, the pumping of the liquid into the high-pressure vessel can be accomplished by direct liquid injection. Such embodiments can use a liquid piston 162. The liquid in the high-pressure vessel reduces volume available for the gas, thereby compressing the gas. The compressed gas can be directed to a desired point, where the gas can be extracted by opening a valve. The liquid thus forms a liquid piston. The pumping of the liquid into the high-pressure vessel can be accomplished by direct liquid injection. Some embodiments include performing heat exchange to cool the liquid before spraying the liquid into the high-pressure vessel.

The pressurizing is most efficient when the temperature of the pressurized gas can be maintained at a desired temperature. In embodiments, the pressurizing the gas can be substantially isothermal. The flow 102 includes performing heat exchange 165 to cool the liquid before spraying the liquid into the high-pressure vessel. Applying pressure to the liquid causes the temperature of the liquid to increase. Since the objective of the spraying a liquid is to cool the gas that is being compressed, excess heat can be removed from the liquid by passing the liquid through a heat exchanger prior to spraying the liquid into the high-pressure vessel.

The flow 102 includes spraying liquid into the high-pressure vessel to cool the gas 170. The spraying can be accomplished using a pump, an auxiliary pump, and so on. In embodiments, the spraying liquid into the high-pressure vessel can be accomplished on two opposing sides of the high-pressure vessel. The "sides" of the vessel can be relative based on the shape of the vessel. The sides can include up, down, left, right, top, bottom, etc. In embodiments, the two opposing sides comprise a top and a bottom of the high-pressure vessel, while in other embodiments, the two opposing sides comprise opposing sidewalls of the high-pressure vessel. The spraying can be accomplished using one or more orifices, injectors, and so on. In the flow 102, the spraying liquid into the top and the bottom (or the left and right) of the high-pressure vessel can be accomplished using nozzles 172 in a top portion and nozzles in a bottom portion of the high-pressure vessel. The spraying can also be accomplished using nozzles in a left portion and nozzles in a right portion of the high-pressure vessel. The amount of liquid that is sprayed can remain constant, can be increased, can be decreased, or can be otherwise modulated. In embodiments, the spraying liquid into the high-pressure vessel to cool the gas can be increased to increase an amount of liquid that is sprayed as pressure within the high-pressure vessel increases.

The liquid that can be pumped, sprayed, injected, and so on, into the high-pressure vessel forms a column. The liquid in the high-pressure vessel and the gas within the high-pressure vessel can meet at an interface. By carefully selecting which gas and which liquid are contained within the high-pressure vessel, diffusion of the gas and the liquid can be minimized. In embodiments, the column forms a liquid piston. The liquid piston can be used for energy storage, energy extraction, and so on. The flow 102 includes transferring the pressurized gas into a storage reservoir 175. The storage reservoir can include above ground or on ground tanks, underwater containers such as bladders pressurized by a weight of liquid above the bladders, underground tanks, and so on. The storage reservoir can include unused oil infrastructure such as disused oil wells. In embodiments, the storage reservoir can include an underground cavern or aquifer.

The flow 102 includes extracting gas from the storage reservoir to drive a turbine 180 to recover stored energy. The turbine can be a component of a pump-turbine. The turbine can be used to drive a generator or alternator to produce electrical energy. Since the pressure associated with the gas stored in the storage reservoir can include a high pressure such as 200 bar or more, the pressurized gas may not be used to drive the turbine directly. In the flow 102 the extracting gas from the storage reservoir is accomplished using an additional high-pressure vessel 182. The additional high-pressure vessel can be substantially similar in size to the first high-pressure vessel, or can be substantially different in size. The gas extracted from the storage reservoir can push a column of liquid within the additional high-pressure vessel. The column of liquid can include a liquid piston. The pressure of the liquid within the additional high-pressure vessel can include a lower pressure compared to the pressure of the gas within the storage reservoir. In embodiments, the column of liquid within the additional high-pressure vessel in turn can drive the turbine to recover the stored energy. Thus, the extracting gas from the storage reservoir can be accomplished using an additional high-pressure vessel. The extracted gas can push a column of liquid within the additional high-pressure vessel. The column of liquid within the additional high-pressure vessel in turn can drive the turbine to recover the stored energy. The delivering the pressurized gas from the storage reservoir to the energy recovery unit can include expanding the pressurized gas in an additional high-pressure vessel. The expanding the pressurized gas can force a column of a third liquid out of the additional high-pressure vessel. The third liquid that is forced out of the additional high-pressure vessel in turn can drive a turbine to recover stored energy.

Some embodiments include spraying a fourth liquid into the additional high-pressure vessel and can include performing heat exchange to warm the fourth liquid before spraying the fourth liquid into the additional high-pressure vessel. The spraying a fourth liquid into the additional high-pressure vessel can be accomplished by spraying liquid into the top and the bottom of the additional high-pressure vessel using nozzles in a top portion and nozzles in a bottom portion of the additional high-pressure vessel. The spraying the fourth liquid into the additional high-pressure vessel can allow substantially isothermal expansion of the gas within the additional high-pressure vessel. The third liquid and the fourth liquid can be of the same composition. The first liquid and the second liquid can be of the same composition. The first liquid and the second liquid can both comprise water.

The flow 102 further includes spraying a fourth liquid 184 into the additional high-pressure vessel. Recalling the Ideal Gas Law, PV=nRT, decreasing pressure of a gas within a given volume causes a decrease in the temperature of the gas. The flow 102 includes performing heat exchange 186 to warm the fourth liquid before spraying the fourth liquid into the additional high-pressure vessel. The warming of the liquid prior to spraying can control a temperature with the additional high-pressure vessel. In embodiments, the spraying liquid into the additional high-pressure vessel can allow substantially isothermal expansion of the gas within the additional high-pressure vessel. In the flow 102, the spraying liquid into the additional high-pressure vessel is accomplished by spraying liquid 188 into the top and the bottom of the additional high-pressure vessel. In other embodiments, the spraying liquid into the additional high-pressure vessel can be accomplished by spraying liquid into the left side and the right side of the additional high-pressure vessel. The spraying can be accomplished using orifices, inlets, injectors, and the like. In the flow 102, the spraying is accomplished using nozzles 190 in a top portion and nozzles in a bottom portion of the additional high-pressure vessel. In other embodiments, the spraying can be accomplished using nozzles in a left portion and nozzles in a right portion of the additional high-pressure vessel.

In embodiments, the pressurizing the gas can be substantially isothermal. In embodiments, the spraying second liquid into the high-pressure vessel can be accomplished using two sprays on opposing sides of the high-pressure vessel. The opposing sides can comprise a top side and a bottom side of the high-pressure vessel. The opposing sides can comprise a left side and a right side of the high-pressure vessel. Multiple variations of spray position in a pressure vessel are possible. In embodiments, the spraying a second liquid into the two opposing sides of the high-pressure vessel can be accomplished using nozzles in the high-pressure vessel. In embodiments, the spraying a second liquid into the high-pressure vessel to cool the gas can be increased to increase an amount of liquid that is sprayed as pressure within the high-pressure vessel increases.

Various steps in the flow 100 and the flow 102 may be changed in order, repeated, omitted, or the like without departing from the disclosed concepts. Various embodiments of the flow 100 and the flow 102 can be included in a computer program product embodied in a non-transitory computer readable medium that includes code executable by one or more processors.

Figure 2:
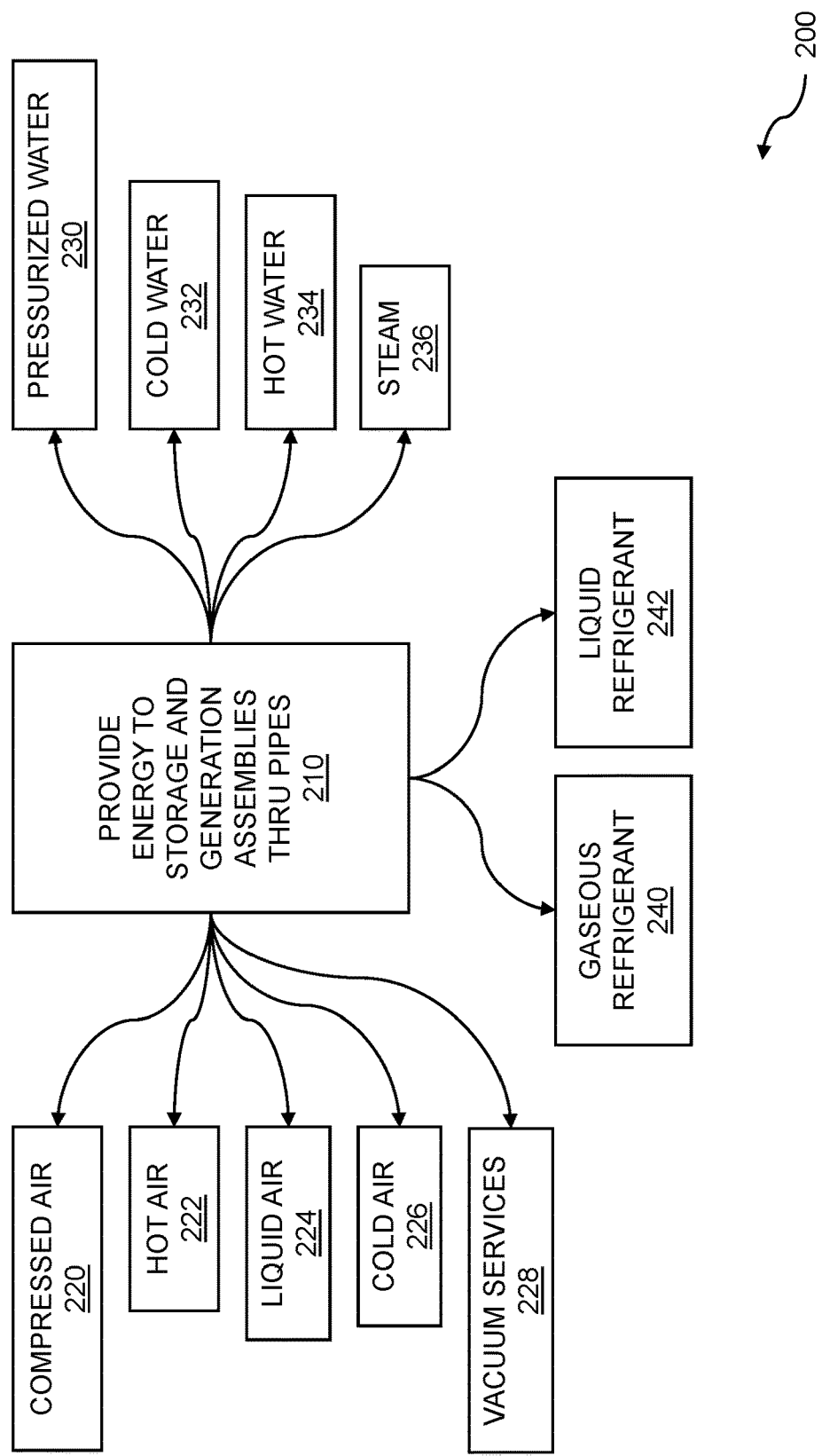
FIG. 2 is a block diagram related to fluid-based energy.

FIG. 2 is a block diagram related to fluid-based energy. Discussed throughout, energy storage and generation assemblies, such as fluid-based energy storage and generation assemblies, can be used to convert various types of energy such as grid energy or renewable energy into a storage format which can be used for later energy generation and use. The energy that can be stored can include excess energy, intermittent energy, etc. The latter use can include providing energy to meet excess demand, to reduce energy production cost, and so on. Access to a fluid-based local energy transfer distribution network is obtained. One or more fluid-based energy storage and generation assemblies are connected to the fluid-based local energy transfer distribution network. Energy is provided to the one or more fluid-based energy storage and generation assemblies. Fluid-based energy from the energy storage and generation assemblies is delivered to the fluid-based local energy transfer distribution network, where the delivering is based on an energy control management system executing on one or more processors.

Described throughout, the one or more fluid-based energy storage and generation assemblies can be controlled in order to implement various functions. In embodiments, the functions can include a compressor function, an expander function, or a heat exchanger function. Other functions may also be implemented. The compressor function can generate heat due to heating of a gas or a liquid as a result of the compression. The expander function can absorb heat based on cooling of the gas or the liquid as a result of the expansion. The heat exchanger function can capture or remove the heat from compression or can provide or inject heat during cooling. In embodiments, the controlling can enable isothermal operation of the one or more fluid-based energy storage and generation assemblies. The heat that can be transferred to or removed from the one or more fluid-based energy storage and generation assemblies can be based on latent heat transfer. Latent heat can be an amount of heat provided to or removed from the one or more fluid-based energy storage and generation assemblies during a phase change that can occur within the assemblies. The phase change can include evaporation of a liquid, deposition of a gas, etc.

The flow 200 includes providing energy to the one or more fluid-based energy storage and generation assemblies. The providing energy to the one or more fluid-based energy storage and generation assemblies can be accomplished using pipes 210. In embodiments, the energy storage and generation assemblies comprise multiple parallel pipes to accommodate fluid expansion or compression. The pipes can be of substantially similar dimensions or of substantially dissimilar dimensions. The pipes can be organized into various structures convenient to energy storage and generation. In embodiments, the multiple parallel pipes are configured in a hierarchy. The hierarchy can be organized or scaled to perform operations on the fluid or fluids within the pipes. In embodiments, the hierarchy can include 2-to-1 piping for compression or 1-to-2 piping for expansion. The hierarchy can include two or more levels or layers. In embodiments, the hierarchy can include no more than seven levels to achieve at least 100 times pressure expansion or contraction.

The fluid-based energy storage and generation assemblies can store and generate energy based on one or more liquids, gases, phases, and the like. The flow 200 includes the fluid-based energy compressed air 220. The compressed air can be provided by a pump-turbine, retrieved from an air compression tank, and so on. The compressed air can be maintained at a given temperature or can be permitted to heat under compression, cool under expansion, etc. In the flow 200, the fluid-based energy comprises hot air 222. The hot air can be created by heating based on combustion of gases such as natural gas, propane, butane, or biogas; compression of the air by a pump-turbine; and the like. In embodiments, the hot air can be supplied to the distribution network at a temperature greater than ambient air temperature. In the flow 200, the fluid-based energy comprises liquid air 224. The liquid air can be provided at a temperature below which the constituents of gaseous air condense. In embodiments, the liquid air is supplied to the distribution network at a temperature less than −215° C.

In the flow 200, the fluid-based energy includes cold air 226. The cold air can be generated by removing thermal energy from air. The temperature of the cold air can include a range of values. In embodiments, the cold air is supplied to the distribution network at a temperature less than ambient air temperature. In the flow 200, the fluid-based energy includes vacuum services 228. The vacuum can be generated by pumping or other techniques. An amount of vacuum can be chosen for fluid-based energy purposes. In embodiments, the vacuum services are supplied to the distribution network at a pressure of less than 14 pounds per square inch vacuum (PSIV). In the flow 200, the fluid-based energy includes pressurized water 230. The pressurized water can be generated by pumping, by creating hydraulic head, and the like. In embodiments, the pressurized water is supplied to the distribution network at a pressure of more than one bar.

Energy can be provided to the one or more fluid-based energy storage and generation assemblies based on latent heat transfer. In embodiments, controlling enables isothermal operation of the one or more fluid-based energy storage and generation assemblies. As explained throughout, isothermal operation can include an adiabicity of near-zero. The latent heat transfer can be controlled. In the flow 200, the controlling provides a cold-water spray 232 to provide cooling during compression. The cold water which can be used to provide the cold-water spray can be cold water stored from an expansion of a liquid or gas. The cold water can be generated as needed for cooling purposes. In embodiments, the latent heat transfer can be provided using an ice-to-water transition. As heat is added to the ice, the ice melts to form water. During the melting process, the temperature of the ice-water remains constant. In the flow 200, the controlling provides a hot water spray 234 to add heat during expansion. The hot water spray can be generated from stored heat captured from a compression of a liquid or gas. The hot water spray can be generated as needed by burning a fuel. In embodiments, the controlling can provide heat during expansion through combustion of a gas. The gas can include natural gas, biogas, etc. In the flow 200, the latent heat transfer can be provided using a water-to-steam transition 236. Latent heat is absorbed by the water as the water evaporates to form steam. The steam can be generated from water based on providing stored energy, combusting a gas, and the like. In the flow 200, the providing energy to the one or more fluid-based energy storage and generation assemblies is based on a gaseous refrigerant 240. Various gaseous refrigerants such as ammonia, carbon dioxide, non-halogenated hydrocarbons, propane, etc. can be used. In the flow 200, the providing energy to the one or more fluid-based energy storage and generation assemblies is based on a liquid refrigerant 242. Various liquid refrigerants can be used. The liquid refrigerants can include specialty liquids such as Freon™. In further embodiments, the latent heat transfer is provided using a transition from a gas refrigerant to a liquid refrigerant.

Figure 3:
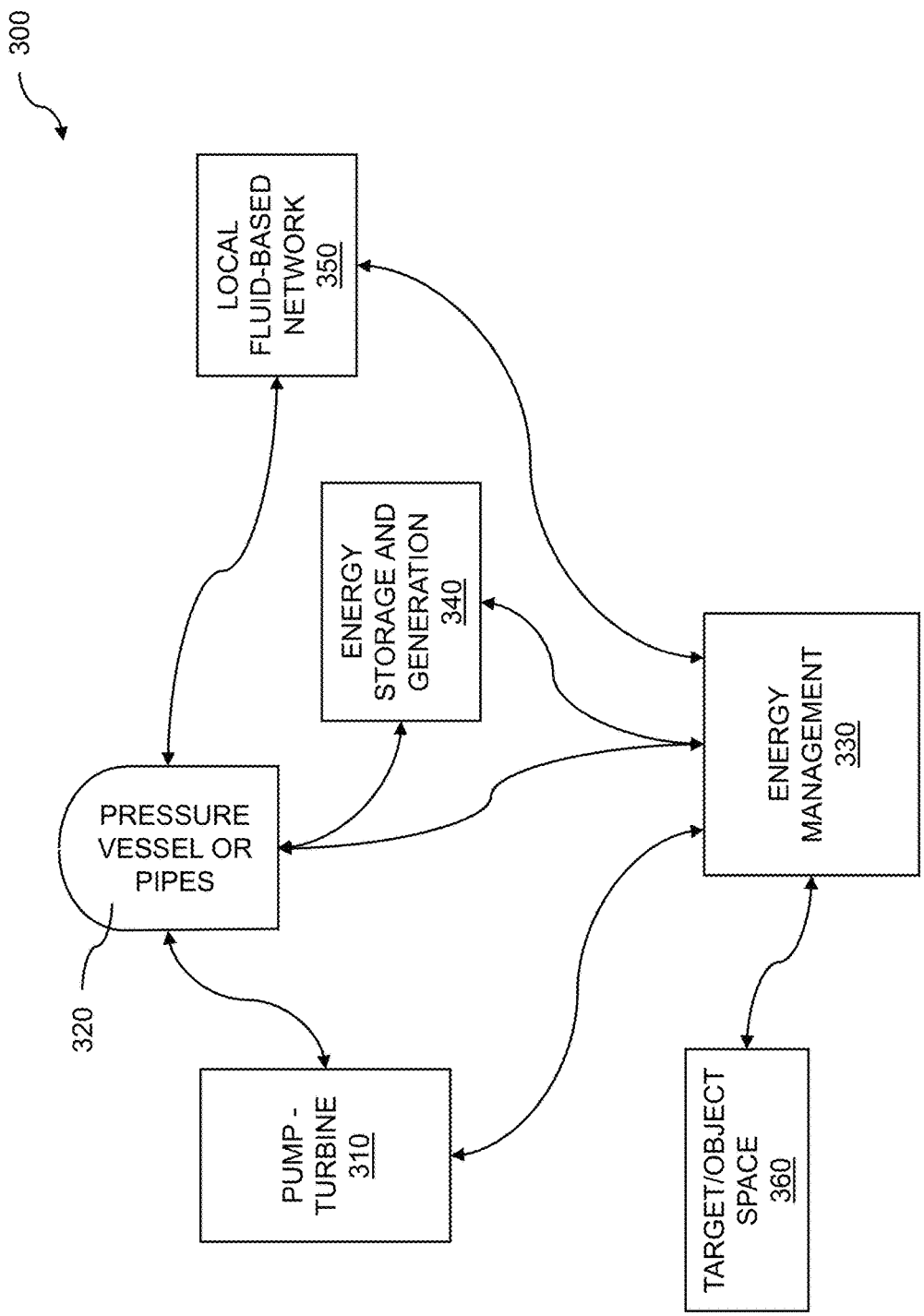
FIG. 3 is a block diagram for energy management.

FIG. 3 is a block diagram for energy management. Energy management can be based on energy transfer through fluid flows. The converged infrastructure can include fluid-based assemblies for energy storage and generation. Access to a fluid-based local energy transfer distribution network is obtained. One or more fluid-based energy storage and generation assemblies are connected to the fluid-based local energy transfer distribution network. Energy is provided to the one or more fluid-based energy storage and generation assemblies. Fluid-based energy from the energy storage and generation assemblies is delivered to the fluid-based local energy transfer distribution network. The delivering is based on an energy control management system executing on one or more processors.

Energy management 300 can include a pump-turbine 310. In embodiments, the pump-turbine can comprise separate pump and turbine components, a combined pump-turbine component, etc. The pump-turbine can be coupled to a vessel. The vessel can comprise a pressure vessel or pressure pipes 320. Energy management can include more than one pump-turbine/pressure vessel or pressure pipes assembly. The pressure vessel can include an air compression tank, a cavern, unused oil infrastructure, and so on. The pressure pipes can include pressure amplification pipes.

The pump-turbine/pressure vessel or pipes assembly can be connected to an energy management component 330. The energy management component can include an energy control management system, where the energy control management system can include software that can be executed on one or more processors. The energy management component can be coupled to energy storage and generation 340. Various types of energy, such as electrical energy, chemical energy, thermal energy, kinetic energy, potential energy, etc., can be stored. Energy storage such as electrical energy storage can include batteries, capacitors, and so on. Fluid-based energy storage and generation assemblies can include multiple parallel pipes to accommodate fluid expansion or compression. The energy management can control the pump of the pump-turbine. In embodiments, at least one of the one or more fluid-based energy storage and generation assemblies includes a pump running at an optimum performance-pressure point. Other energy storage techniques can be used. When the energy being stored is electrical energy, the electrical energy can be converted between direct current (DC) electrical energy and alternating current (AC) electrical energy. Energy storage can be accomplished using flywheels which can be separate from or included as part of a motor or generator.

The energy management can include a local fluid-based network 350. The fluid-based network can include energy management, energy storage and generation, pressure vessels or pressure pipes, pump-turbines, and so on. The local fluid-based network can be used for delivering fluid-based energy. In embodiments, the delivering includes providing local, fluid-based services. The fluid-based services can include domestic services, industrial or manufacturing services, and the like. In embodiments, the local, consumer applications can include a water nozzle, an air nozzle, a water Venturi function, an air Venturi function, a vacuum supply, space heating, a fluid-based rotation, space cooling, hot water, or cold water. The delivering can provide other services such as motion services. In embodiments, the delivering includes providing a fluid-based equivalent mechanical range of motion through fluid transfer. The energy management can include a target/object space 360.

Fluid-based energy transfer can include conveying a fluid flow to a target object or target space. The conveyance of the fluid flow can be accomplished using ducts, pipes, Venturi functions, nozzles, and so on. In embodiments, the conveyance can include two-phase heterogeneous or two-phase homogeneous compression. A pump or pump-turbine can be used to pressurize water for example, where the pressurized water can be used to compress air or other gas. The pump or pump-turbine can be used to compress air or a gas, where the pressurized air or gas can be used to pressurize a liquid such as water.

Figure 4:
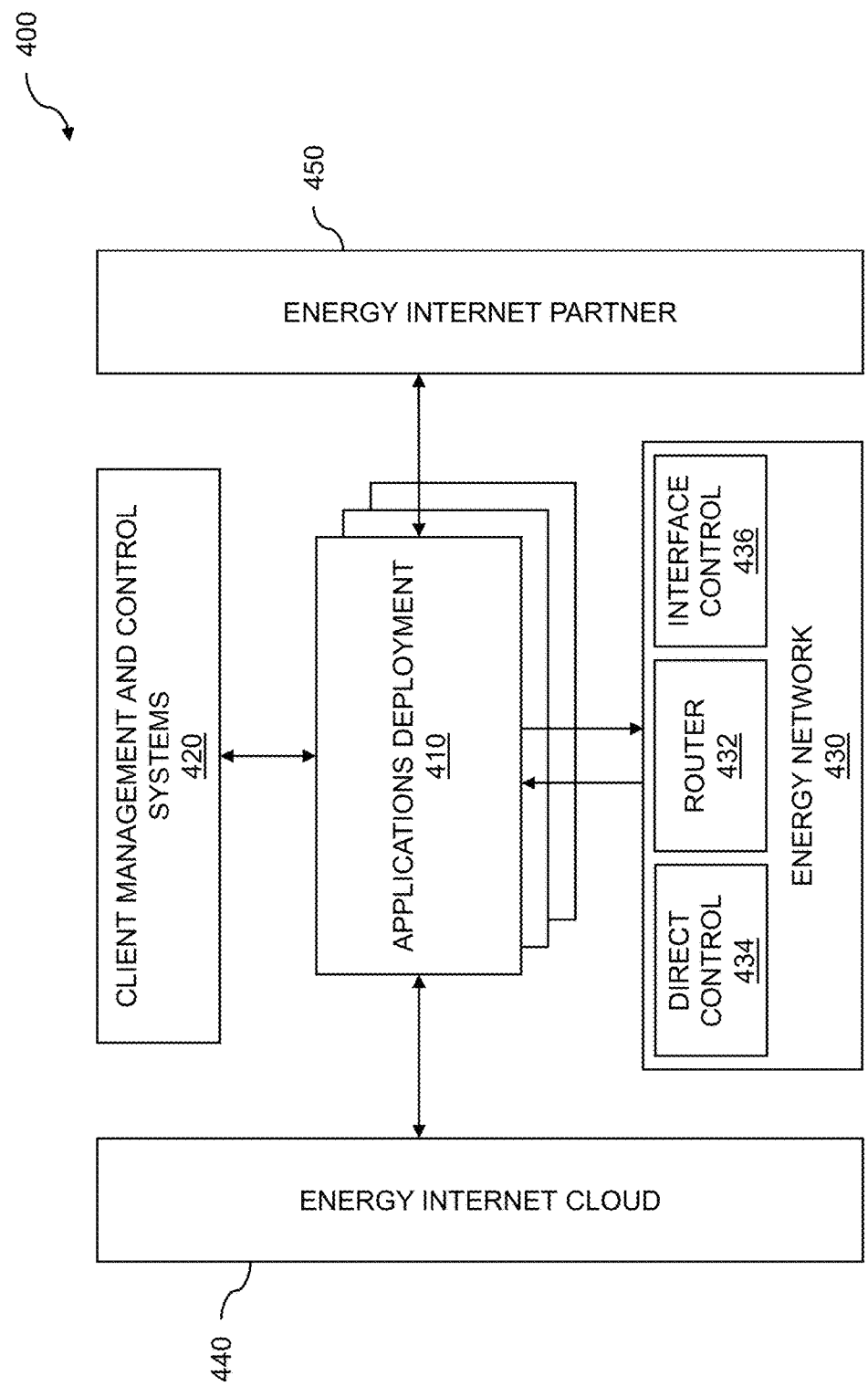
FIG. 4 illustrates an energy internet block diagram.

FIG. 4 illustrates an energy internet block diagram. An energy internet 400 enables energy management, where the energy management can be accomplished using a converged infrastructure. Energy management is further based on energy transfer through fluid flows. Access to a fluid-based local energy transfer distribution network is obtained. One or more fluid-based energy storage and generation assemblies are connected to the fluid-based local energy transfer distribution network. Energy is provided to the one or more fluid-based energy storage and generation assemblies. Fluid-based energy from the energy storage and generation assemblies is delivered to the fluid-based local energy transfer distribution network. The delivering is based on an energy control management system executing on one or more processors. The energy internet can include applications deployment 410. The applications deployment for an energy internet can include a cluster, where the cluster includes one or more application programming interfaces (APIs) for handling data, policies, communications, control, and so on. The data can include energy storage, pump-turbine storage, energy from waterpower, grid energy, etc. The data can include information from energy generators, partners, and so on. The data can further include third-party data from parties including energy consumers such as oil rigs; solar, wind, tidal, or wave-action farms; data centers; and the like.

Applications deployment can communicate with client management and control systems 420. The management can include infrastructure management, microgrid management, operating management, automated controls, and so on. The management can include management of client legacy equipment. The communicating of applications deployment with client management and control systems can include collecting data from one or more points of energy generation, one or more points of energy load, etc. The communicating can further include sending one or more energy control policies. The energy control policies can be based on the energy, energy information, energy metadata, availability of a large-scale energy storage subsystem, and the like.

The energy internet can include an energy network 430. The energy network can include one or more energy routers 432, direct control 434, interface control 436, and so on. An energy router 432 can include digital switches for routing energy from a point of energy generation to a point of energy load. An energy router can be coupled to one or more direct control 434 sensors for detecting switch status, point of source status, point of load status, etc. An energy router can be coupled to direct control actuators for steering energy from one or more points of source to a given point of load. An energy router can be further connected to one or more third-party interface control 436 sensors and third-party interface control actuators. The interface control sensors and interface control actuators can be coupled to equipment such as legacy equipment which may not be directly controllable.

The energy internet (EI) can include an energy internet cloud 440. The energy internet cloud can include an energy internet ecosystem, an energy internet catalog, and so on. The energy internet cloud can include an energy internet secure application programming interface (API) through which the EI cloud can be accessed. The EI ecosystem can include third-party applications such as an application or app store, app development and test techniques, collaboration, assistance, security, and so on. The EI cloud can include an EI catalog. The EI catalog can include technology models, plant and equipment information, sensor and actuator data, operation patterns, etc. The EI cloud can include tools or "as a service" applications such as learning and training, simulation, remote operation, and the like. The energy internet can include energy internet partners 450. The EI partners can provide a variety of support techniques including remote management, cloud support, cloud applications, learning, and so on.

Figure 5:
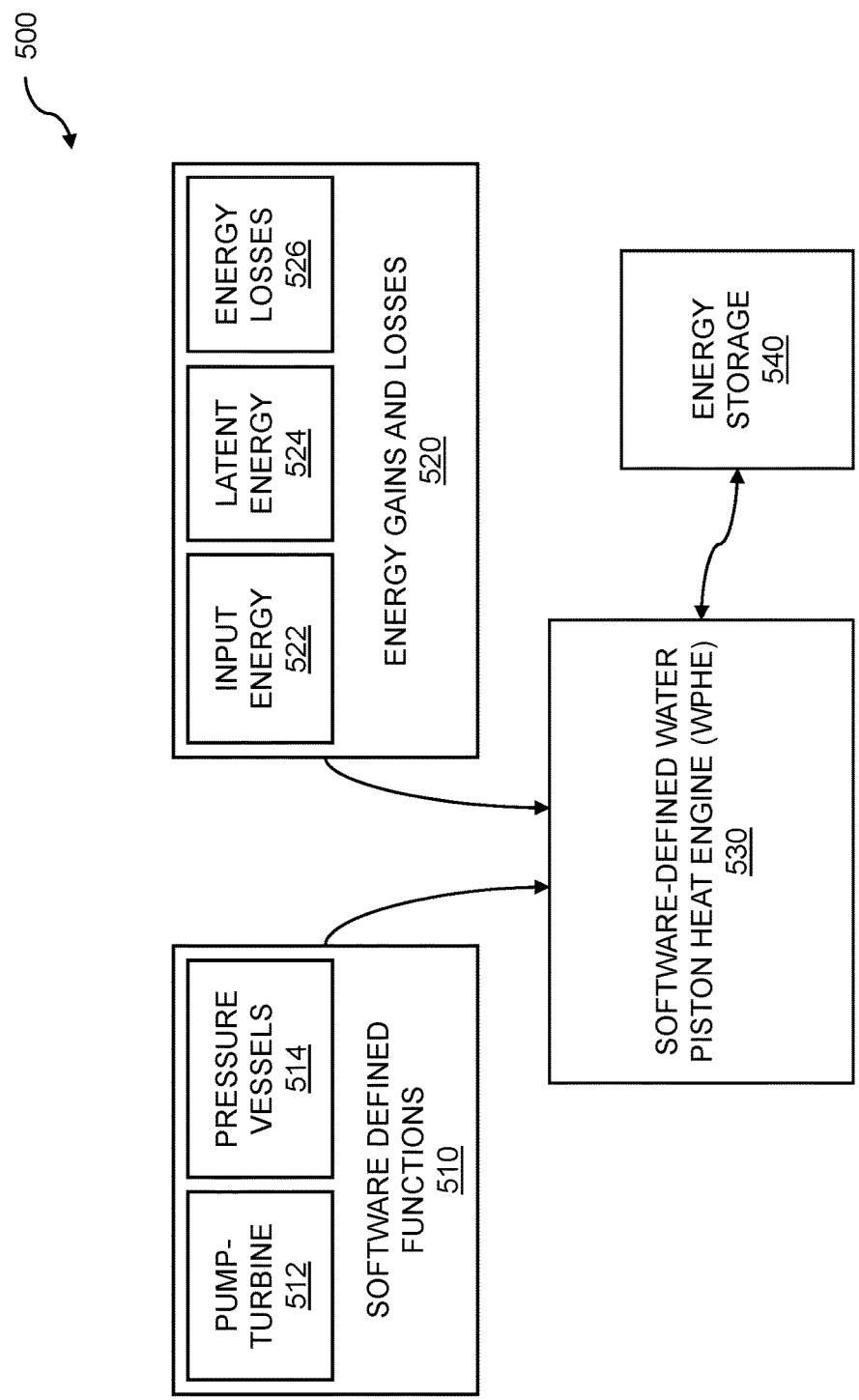
FIG. 5 shows a software-defined water piston heat engine (WPHE).

FIG. 5 shows a software-defined water piston heat engine. Energy can be generated, stored, recovered, transformed, delivered, and so on, to meet energy load requirements. Energy storage can be performed when a surplus of energy is being generated from energy sources including renewable energy sources such as wind, solar, tidal, wave-action, and so on. The energy can be stored on a short-term basis, such as a length of time substantially less than one week, or on a long-term basis, such as a length of time substantially more than one day. The energy transforming and delivering can be used for energy transfer through fluid flows for energy management. Access to a fluid-based local energy transfer distribution network is obtained. One or more fluid-based energy storage and generation assemblies are connected to the fluid-based local energy transfer distribution network. Energy is provided to the one or more fluid-based energy storage and generation assemblies. Fluid-based energy from the energy storage and generation assemblies is delivered to the fluid-based local energy transfer distribution network, where the delivering is based on an energy control management system executing on one or more processors. In embodiments, the delivering includes providing local, fluid-based services, where the local, fluid-based services supply local consumer applications. The local consumer applications include a water nozzle, an air nozzle, a water Venturi function, an air Venturi function, a vacuum supply, space heating, a fluid-based rotation, space cooling, hot water, or cold water.

A software-defined water piston heat engine system 500 is shown. The water piston heat engine includes one or more software-defined functions 510. The one or more software-defined functions can configure or control energy management system components, subsystem components, etc. The software-defined functions can include a pump-turbine function 512. The pump-turbine function can be used to control components such as one or more pumps, one or more turbines, and so on. The pump-turbine function can include one or more pump-turbine subsystems. Embodiments include operating the pump-turbine subsystem at an optimal pressure-performance point for the pump-turbine subsystem. An optimum pressure-performance point can be determined using one or more processors. The pump-turbine function can comprise physical components, moving components, etc. The software-defined functions can include one or more pressure vessels 514. The one or more pressure vessels can be used to store energy within a pressurized fluid, a pressurized gas, and the like. The one or more pressure vessels can include above-ground tanks, below-ground tanks, caverns such as salt caverns, unused oil infrastructure such as unused oil wells, etc.

The water piston heat engine can include energy gains and losses 520. Energy gains can include input energy 522. The input energy can include energy that can be input for storage. The input energy can include grid energy, locally generated energy, renewable energy, and so on. Energy gains can include latent energy 524. Latent energy can be captured from phase changes such as a change from a gas to a liquid, from a liquid to a solid, and so on. The latent energy can be stored. The water piston heat engine can include energy losses. Energy losses 526 can include pressure losses from pressurized vessels, temperature losses, electrical charge leakage, and so on. The system 500 includes a software-defined water piston heat engine (WPHE) 530. The software-defined WPHE can use software to configure the software-defined functions, to control energy storage and recovery, and so on. The WPHE can include an energy management system that can be operated by an energy management control system. The energy management control system can add or remove energy generation subsystems or energy storage subsystems as needed. The energy management control system can support hot swapping of one or more subsystems. Hot swapping subsystems can include replacing faulty subsystems, swapping out subsystems for maintenance, and the like. In embodiments, the energy management control system can control coupling of the energy, the pump-turbine subsystem, and the one or more pressure amplification pipes. The energy management control system, such as the fluid-based energy management system, includes storing energy for a period of time. The period of time can include a short-term basis or a long-term basis. In embodiments, the short-term basis can be an integer number of seconds, minutes, hours, or days, wherein the integer number of seconds, minutes, hours, or days comprises a length of time substantially less than one week. Other time increments can be used. In other embodiments, the long-term basis can be an integer number of weeks, months, seasons, or years, wherein the integer number of weeks, months, seasons, or years comprises a length of time substantially more than one day.

The system 500 includes energy storage 540. Energy that can be stored can include electrical energy, chemical energy, mechanical energy, fluid energy, gas energy, and so on. Energy can be stored using one or more of the energy storage and generation assemblies. In embodiments, energy storage and generation assemblies comprise multiple, parallel pipes to accommodate fluid expansion or compression. As discussed throughout, the pipes, including the parallel pipes, can include a high-pressure input pipe, a hierarchy of intermediate-pressure pipe layers, low-pressure storage pipes, and so on. In embodiments, the fluid of the one or more fluid-based energy storage and generation assemblies can include liquid air. Further liquids may also be used within the energy storage and generation assemblies. In other embodiments, the further liquids can include liquid nitrogen, Freon™, and the like.

Figure 6A:
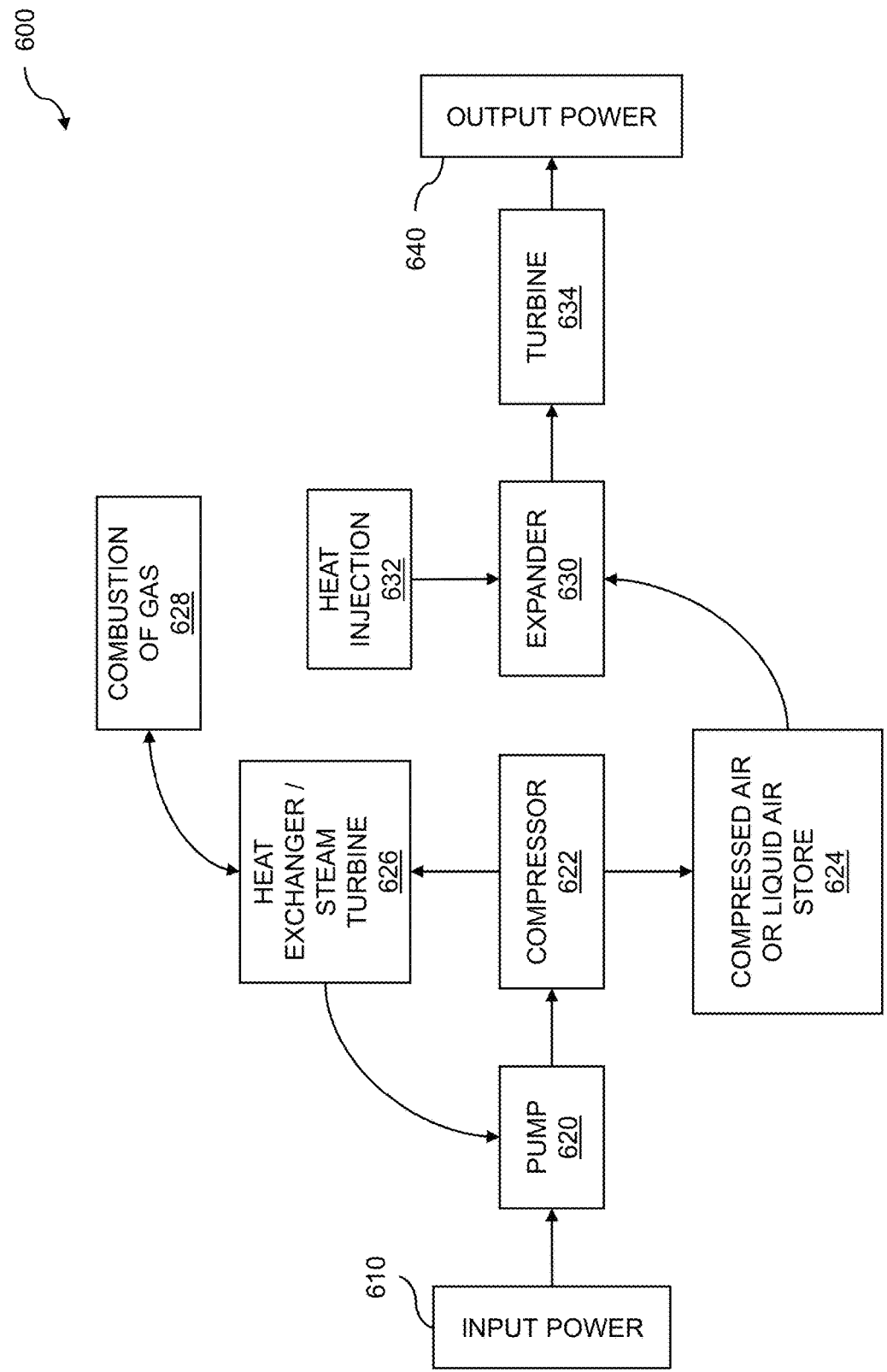
FIG. 6A illustrates energy storage and recovery.

FIG. 6A illustrates energy storage and recovery 600. Energy storage and recovery can be can based on energy management. Energy management can include controlling energy storage, generation, connection, provision, delivery, and so on, where the control can be software based. Energy management can include storing energy for a period of time, where the period of time can include a short-term basis, a long-term basis, etc. The stored energy can be recovered and delivered to meet one or more energy load requirements. The energy recovery and delivery can be based on energy load requirements, seasonal adjustments, energy generation and usage policies, service level agreements, and the like. Energy storage and recovery can enable energy transfer through fluid flows for energy management. Access to a fluid-based local energy transfer distribution network is obtained. One or more fluid-based energy storage and generation assemblies are connected to the fluid-based local energy transfer distribution network. One or more fluid-based energy storage and generation assemblies are connected to the fluid-based local energy transfer distribution network. Energy is provided to the one or more fluid-based energy storage and generation assemblies. Fluid-based energy from the energy storage and generation assemblies is delivered to the fluid-based local energy transfer distribution network, wherein the delivering is based on an energy control management system executing on one or more processors.

Input power 610 can include energy sources such as grid energy from sources that are derived from coal or natural gas, hydro, and nuclear sources; and renewable energy that is derived from sources such as biogas, solar, wind, geothermal, tidal, and wave action. Energy produced from some renewable energy sources can be intermittent. Solar or wind generation relies on the presence of sunlight or wind, respectively. Energy output from solar generation is at a minimum on a cloudy day, and substantially zero at night, while wind generation is substantially zero when the wind is calm. Since energy load requirements persist even in the absence of sunlight or wind, for example, it is necessary to store energy that is generated intermittently for later use. Energy from intermittent sources can be stored. Energy storage can be based on electrical storage, chemical storage, pressure storage, and so on. In embodiments, energy can be stored by using a pump 620. The pump can include an electrically operated pump, a pump driven by a turbine, and the like. The pump can drive a compressor 622 which can be used to store energy in various forms. In embodiments, the compressor can be used to store energy as compressed air or liquid air. The compressed air or the liquid air can be collected in a store 624. The compressor can also be used to generate steam. In embodiments, the compressor can drive a heat exchanger/steam turbine 626. The steam can be used to spin the turbine, which can be used to operate the pump 620. Energy, such as excess heat, including latent heat, can be collected using the heat exchanger. In embodiments, the collected energy can be used to preheat compressed air that can then be used to spin a turbine. As for other components related to energy storage and recovery, the heat exchanger/steam turbine can be controlled. The control can be accomplished using software-based management. In embodiments, the controlling can provide heat during expansion through combustion of a gas 628.

The compressed air or liquid air can be coupled to an expander 630. The expander can be coupled to a turbine 634, where the turbine can be spun by the release of the compressed air or liquid air. As compressed air expands or is released, the compressed air cools. The result of the cooling air can be to precipitate out any moisture that may be contained within the compressed air. The precipitating moisture can cause the turbine to freeze or ice up due to an accumulation of frost within the turbine. To prevent icing up of the turbine, heat collected by the heat exchanger can be injected 632 into the expander 630. The turbine can be coupled to or can include a generator (not shown). The generator can produce output power 640. The output power can be used to meet increased power load requirements. The output power can be generated from the stored energy, where the stored energy can be generated by the intermittent power sources. The output power can be generated from the stored energy after a period of time that is assigned on a short-term basis or a period of time that is assigned on a long-term basis.

Figure 6B:
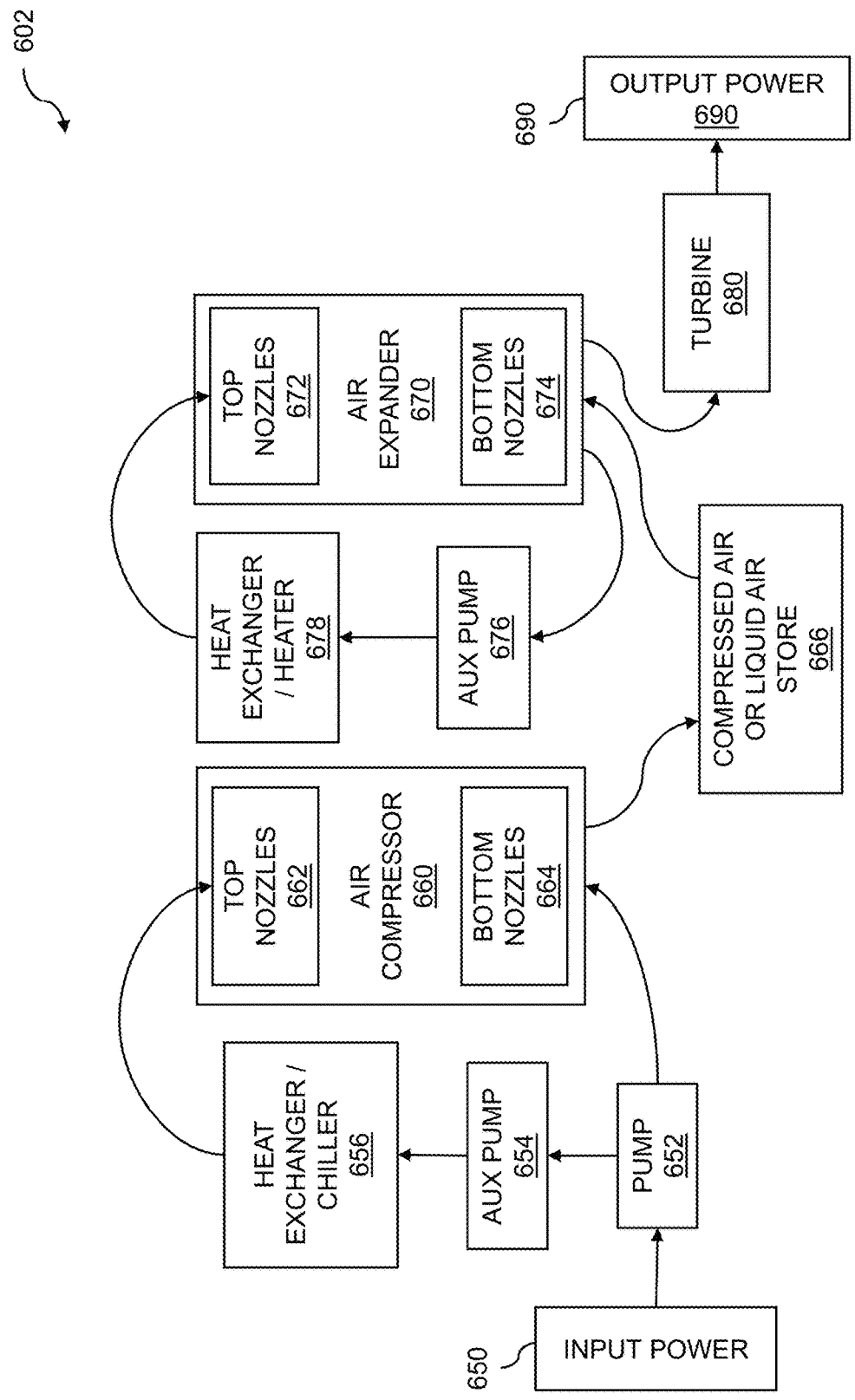
FIG. 6B illustrates near-isothermal high-pressure compression.

FIG. 6B illustrates near-isothermal high-pressure compression 602. Near-isothermal operation can be described as substantially isothermal, because true isothermality can only be achieved in an ideal system. Discussed throughout, energy storage, including long-term storage, and energy recovery can be can based on energy management. Energy generation, provision, storage, connection, delivery, and the like can be controlled using one or more energy management techniques. The control can be accomplished using techniques based on software. Energy management can further include storing energy for a period of time, where the period of time can include a short-term basis, a medium-term basis, or a long-term basis, etc. The energy that has been stored can be recovered, where the recovered energy can be delivered to meet various energy load requirements. The energy recovery and delivery can be based on energy load requirements, seasonal adjustments, energy generation and usage policies, service level agreements, and the like. Energy storage and recovery can enable energy transfer using high-pressure vessels. Pumping of a liquid into a high-pressure vessel is controlled to accomplish pressurizing a gas. Liquid is sprayed into the high-pressure vessel to cool the gas. The pressurized gas is provided into a storage reservoir. Gas is extracted from the storage reservoir to drive a turbine to recover stored energy.

Input power 650 can include a variety of energy sources such as grid energy from sources that are derived from coal or natural gas, hydro, and nuclear sources; and renewable energy that is derived from sources such as biogas, solar, wind, geothermal, tidal, and wave action. Energy produced from some renewable energy sources can be intermittent. Since energy load requirements persist, energy storage is required to capture the energy that is generated intermittently. Energy from intermittent sources can be stored. Energy storage can be based on electrical storage, chemical storage, pressure storage, and so on. In embodiments, energy storage can include using a pump 652. The pump can include an electrically operated pump, a pump driven by a turbine, a pump operated by a compressed gas, and the like. The pump can drive a compressor 660 (described below) which can be used to store energy in various forms. The pump can be coupled to an auxiliary pump 654. The auxiliary pump can be similarly operated to the pump. The auxiliary pump can be coupled to a heat exchanger 656. Embodiments include performing heat exchange to cool the liquid provided by the auxiliary pump. The cooling of the liquid can be accomplished before spraying the liquid into the high-pressure vessel such as the air compressor 660.

Returning to the pump 652, the pump can be used to pump liquid into the air compressor. The compressing can include compressing a column of gas such as air. As the air is compressed, heat emanates. In order to counteract the heating caused by the compressing, liquid can be sprayed into the high-pressure vessel. In embodiments, the spraying liquid into the high-pressure vessel can be accomplished on two opposing sides of the high-pressure vessel, where the spraying can be accomplished using nozzles. Two nozzles on opposing sides of the vessel are shown, top nozzles 662 and bottom nozzles 664. In other embodiments, the nozzles on opposing sides of the vessel can include left nozzles and right nozzles (not shown). The spraying via the top nozzles can be accomplished using chilled liquid from the heat exchanger/chiller 656. The amount of liquid that is sprayed can be adjusted. In embodiments, the spraying liquid into the high-pressure vessel to cool the gas can be increased to increase an amount of liquid that is sprayed as pressure within the high-pressure vessel increases. The compressed air or liquid that can result from the pressurizing can be stored within a compressed air or liquid air store 666 or storage reservoir. The air or liquid air storage reservoir can be located above ground, under water, in disused oil infrastructure, and so on. In embodiments, the storage reservoir can include an underground cavern or aquifer.

Energy can be recovered by extracting gas from the storage reservoir and using the extracted gas to drive a turbine. In embodiments, the extracting gas from the storage reservoir can be accomplished using a second high-pressure vessel such as an air expander 670. As the gas such as air is extracted into the air expander, the air impinges on the contents of the air expander. In embodiments, the extracted gas pushes a column of liquid within the second high-pressure vessel. As the air expands, it cools. Since there can be some moisture within the air, air that is permitted to cool sufficiently can cause rime or ice to build up within the air expander or associated components. Heat can be applied to the air to prevent freezing or "freeze ups". Embodiments include spraying liquid into the second high-pressure vessel. The spraying can be accomplished using nozzles located at two opposing sides of the high-pressure vessel or air expander. Two sets of nozzles are shown, top nozzles 672 oriented at the top of the air expander, and bottom nozzles 674 oriented at the bottom of the air expander. In other embodiments, the two sets of nozzles can include left nozzles oriented at the left of the air expander and right nozzles (not shown) oriented at the right of the air expander. Liquid such as liquid air or another liquid can be provided to the bottom nozzles from the storage reservoir. An auxiliary pump 676 can be used to pump liquid from the air expander and can provide that liquid to a heat exchanger/heater 678. The heat exchanger/heater can provide heated liquid to the top nozzles to heat the chilled air within the air expander. Discussed above, a column of liquid can be present within the air expander. In embodiments, the column of liquid within the second high-pressure vessel or air expander can in turn drive a turbine 680 to recover the stored energy. The turbine can be spun by a release of compressed air, liquid air, and so on. The turbine can be coupled to or can include a generator or alternator (neither shown). The generator can produce output power 690. The output power can be used to meet increased power load requirements. The output power can be generated from the stored energy, where the stored energy can be generated by the intermittent power sources. The output power can be generated from the stored energy after a period of time that is assigned on a short-term basis or a period of time that is assigned on a long-term basis. Air compressor 660 can comprise a liquid piston compressor. Air expander 670 can comprise a liquid piston expander.

Figure 7:
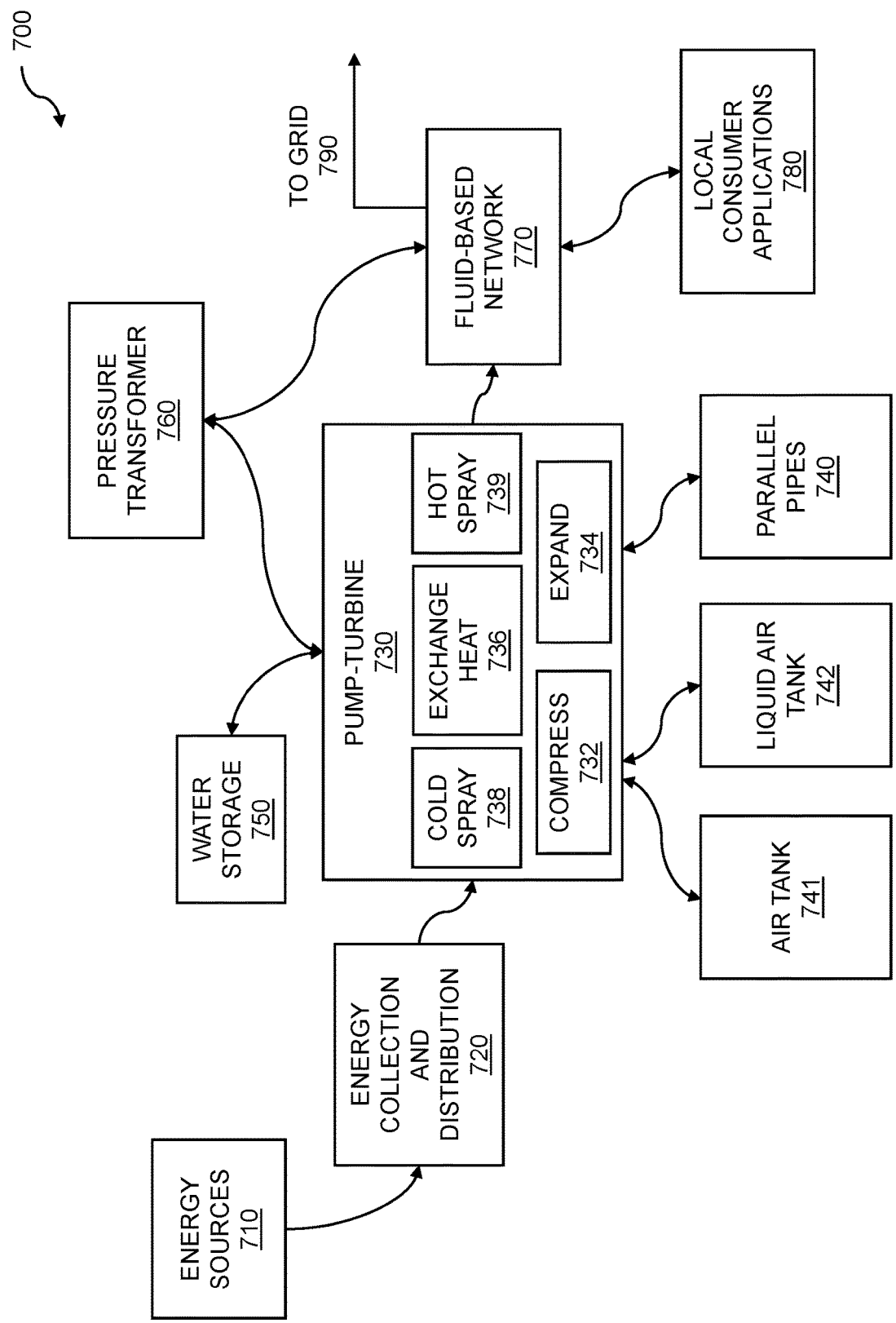
FIG. 7 shows fluid-based energy transfer.

FIG. 7 shows fluid-based energy transfer. Energy transfer through fluid flows for energy management can include a variety of energy related components. The energy management that controls or manages the energy related components can be controlled by software. The software can include software-defined functions relating to energy such as generating, storing, providing, and managing energy. Energy management can include an energy internet converged infrastructure. Access to a fluid-based local energy transfer distribution network is obtained. One or more fluid-based energy storage and generation assemblies are connected to the fluid-based local energy transfer distribution network. Energy is provided to the one or more fluid-based energy storage and generation assemblies. Fluid-based energy from the energy storage and generation assemblies is delivered to the fluid-based local energy transfer distribution network, where the delivering is based on an energy control management system executing on one or more processors. The obtaining, the connecting, the providing, and the delivering comprise an energy internet converged infrastructure. The energy internet converged infrastructure enables software-controlled energy delivery optimization.

Fluid-based energy transfer 700 can include one or more components for storing or generating energy used for fluid-based energy transfer. The fluid-based energy transfer can include one or more energy sources 710. The energy sources can include electrical generation from grid sources that can include oil, coal, natural gas, or nuclear; renewable energy sources such as biogas, solar, wind, hydro, geothermal, tidal, or wave action; and the like. The renewable energy sources may be locally available on a microgrid. The energy sources can be obtained and delivered using energy collection and distribution 720. The energy collection and distribution can include coupling a fluid-based energy transfer component to one or more electrical grids, one or more microgrids, etc. The one or more electrical grids or one or more microgrids can include redundant energy sources such as multiple grids, backup energy sources such as diesel-generator (DG) sets, previously stored energy, and the like.

The energy from the energy sources can be provided to a pump-turbine 730. The pump-turbine can include a separate pump component and a separate turbine component, a combined single component, etc. The pump-turbine can be used to pressurize a pressure vessel, can be rotated by gas or liquid leaving the pressure vessel, and so on. The pump portion of the pump-turbine can use energy such as electrical energy to spin the turbine. The spinning turbine can be used to move gas or liquid into a vessel such as the pressure vessel, to compress a gas, etc. The turbine portion of the pump-turbine can use energy such as flowing liquid or expanding gas to spin the pump. In embodiments, the pump can be used to generate energy such as electrical energy. The pump-turbine can perform a variety of operations or functions, where the operations or functions can be controlled, and where the control of the operations or functions can be software defined. In embodiments, the pump-turbine can include a compression function 732. The compression function can compress a gas such as air or nitrogen, a specialty gas such as Freon™, etc. The compression function can be accomplished using the pump-turbine, a pump, a turbine, etc. In other embodiments, the pump-turbine can include an expansion function 734. Gas or liquid can be used to spin a turbine, the pump-turbine, and so on. The gas or liquid can be released from the pressure vessel. The pump-turbine can accomplish other operations. In further embodiments, the pump-turbine can include a heat exchanger 736. Thermal energy can be generated by compressing a gas. The thermal energy can be captured using a heat exchanger. In other embodiments, thermal energy can be injected using the heat exchanger. The pump-turbine can include a cold spray 738. In embodiments, the controlling can provide a cold-water spray to provide cooling during compression. The cold spray can be used to reduce temperature of the pump-turbine or another component while a gas is being compressed. The pump-turbine can include a hot spray 739. Thermal energy can be absorbed by an expanding gas. In embodiments, the controlling can provide a hot water spray to add heat during expansion. The hot water spray can be used to inject thermal energy into the pump-turbine or other components to keep them from accumulating frost or from "freezing up" if water vapor in the gas condenses.

Discussed throughout, the pump-turbine can pressurize multiple pipes, a pressure vessel, and so on. In embodiments, the energy storage and generation assemblies can include multiple, parallel pipes 740 to accommodate fluid expansion or compression. The multiple, parallel pipes can be organized into a variety of configurations. In embodiments, the multiple, parallel pipes can be configured in a hierarchy. In embodiments, the pressure vessel can include an air tank 741. The air tank can store a compressed gas such as air or nitrogen, or a specialty gas such as Freon™. In embodiments, the pressure vessel can include a tank for liquefied gases, such as liquid air tank 742. In other embodiments, the liquid air can be supplied to the distribution network at a temperature less than −215° C. The air compression tank can be used to pressurize another tank, cavity, and so on. In embodiments, the pump-turbine can be used to pressurize a cavern. The cavern can include a void below ground, a capsule positioned underwater, and so on. In other embodiments, the pump-turbine can be used to pressurize other infrastructure such as unused oil infrastructure. The pump-turbine can be used to pressurize unused oil wells. The compression accomplished by the pump-turbine can include one or more liquids. In embodiments, energy can be stored in water storage 750. Water storage can include pumping water to higher elevation to create a fluid head, where the fluid head can be used to spin a turbine for energy generation. The water can be fresh water, salt water, or brackish water.

In embodiments, at least one of the one or more fluid-based energy storage and generation assemblies can include a pump running at an optimum performance-pressure point. An optimum performance-pressure point can be controlled by software. The optimum performance-pressure point can be determined by design, by measuring pump performance, etc. Further embodiments include converting the pump optimum performance-pressure point pressure to a required pressure within the fluid-based local energy transfer distribution system using a pressure transformer amplifier 760. The pressure transformer function can be accomplished using a variety of techniques. In embodiments, the pressure transformer amplifier can use two or more pressure amplification pipes. The pressure amplifier pipes can be organized in different configurations, where the configurations can include a hierarchy. In embodiments, the hierarchy can include 2-to-1 piping for compression or 1-to-2 piping for expansion. The number of levels within the hierarchy can be chosen based on design, optimization, and the like. In embodiments, the hierarchy comprises no more than seven levels to achieve at least 100 times pressure expansion or contraction.

Fluid-based energy transfer can include a fluid-based network 770. A fluid-based network, such as a fluid-based local energy transfer distribution network can be based on one or more fluids, one or more gases, and so on. In embodiments, the fluid-based local energy transfer distribution network can include at least two heterogeneous fluids. A given fluid can include multiple phases. In embodiments, the fluid-based local energy transfer distribution network includes a homogeneous fluid in liquid and gaseous phases. The fluid-based network can provide one or more services, where the one or more services can meet various types of applications. In embodiments, the local, fluid-based services can supply local consumer applications 780. Consumer applications can include residential applications, public or governmental applications, manufacturing or processing applications, and the like. In embodiments, the local consumer applications can include a water nozzle, an air nozzle, a water Venturi function, an air Venturi function, a vacuum supply, space heating, a fluid-based rotation, space cooling, hot water, or cold water. Fluid-based energy transfer can be used for energy distribution. Energy distribution can include distributing energy locally such as around a plant or facility, a farm, a neighborhood, and so on. Energy distribution can include delivering energy from the pump-turbine to a local grid or micro-grid. Energy distribution can include providing energy farther afield. The energy distribution can include providing energy to a grid 790. The grid can include a municipal grid, a state-wide grid, a regional grid, a national grid, etc.

Figure 8:
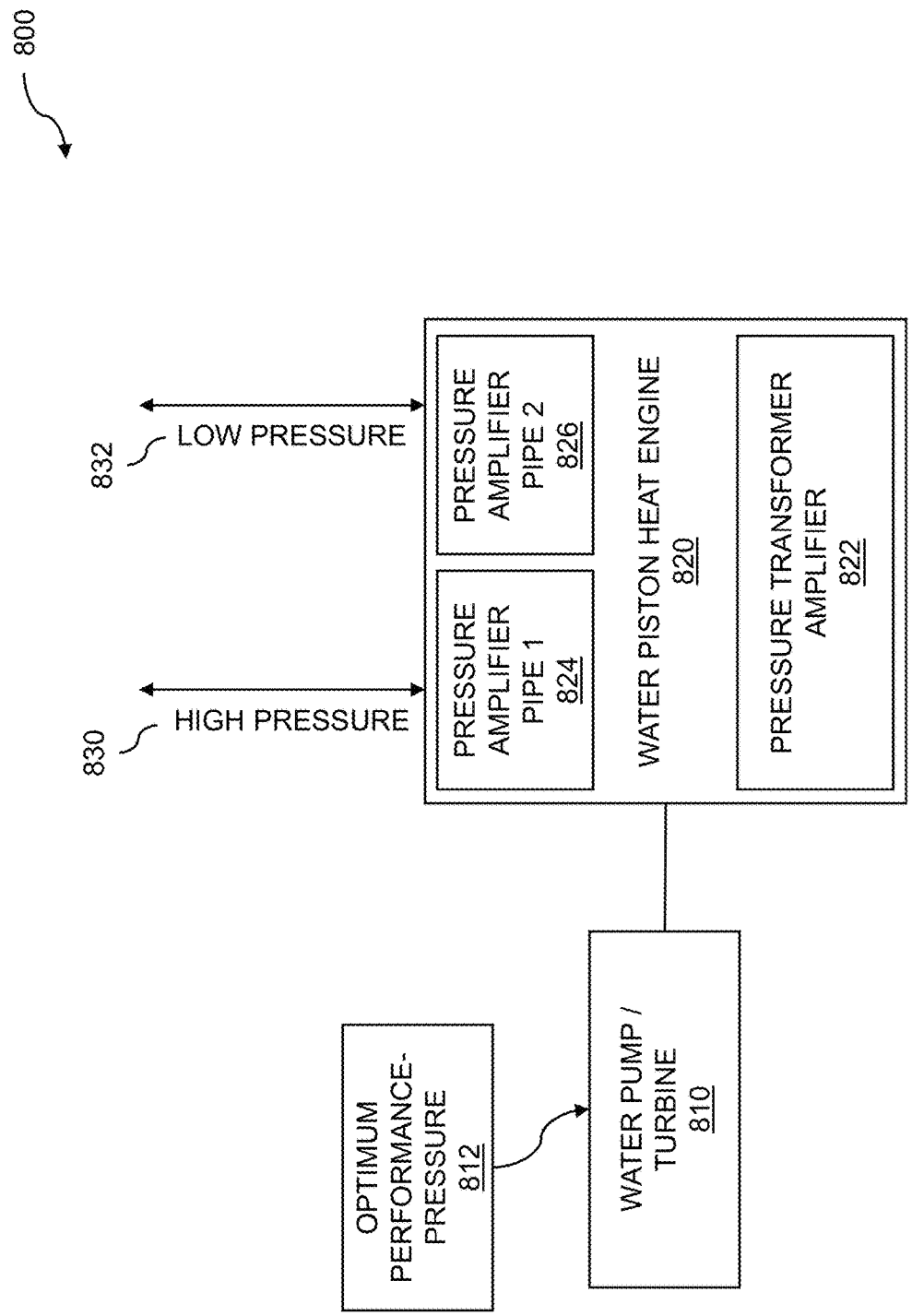
FIG. 8 illustrates fluid-based pump energy input/output.

FIG. 8 illustrates fluid-based pump energy input/output. Input energy or output energy, including grid energy, renewable energy, and so on, can be stored or provided based on gaseous energy transfer, liquid energy transfer, electrical energy storage, chemical energy storage, and so on. Energy can further be stored or provided using pressure amplification, where the pressure amplification can be based on pressure amplifier pipes. The energy that is stored or provided can be transferred through fluid flows. The fluid flows enable energy transfer for energy management. Access to a fluid-based local energy transfer distribution network is obtained. One or more fluid-based energy storage and generation assemblies are connected to the fluid-based local energy transfer distribution network. Energy is provided to the one or more fluid-based energy storage and generation assemblies. A fluid-based energy storage and generation assembly can include a pump-turbine subsystem. Fluid-based energy from the energy storage and generation assemblies is delivered to the fluid-based local energy transfer distribution network. The delivering is based on an energy control management system executing on one or more processors.

Fluid-based pump energy input 800 can include a water pump/turbine 810. The water pump/turbine can be a component of a fluid-based energy storage and generation assembly. While a water pump/turbine is shown and described, the pump/turbine can include a pump for pumping gases, a pump for two phases of matter such as gas and liquid, a pump for a slurry, and so on. The fluid-based pump can be integral to the pump-turbine component, a standalone pump, etc. In embodiments, at least one of the one or more fluid-based energy storage and generation assemblies can include a pump running at an optimum performance-pressure point 812. An optimum performance-pressure point can be determined based on the design of the fluid-based energy storage and generation assembly, on past performance of the assembly, and so on. The optimization can be accomplished by adjusting pump speed, fluid pressure, and the like.

Further embodiments can include converting the pump optimum performance-pressure point pressure to a required pressure within the fluid-based local energy transfer distribution system using a pressure transformer amplifier.

The water pump/turbine can provide input energy to a water piston heat engine 820 (WPHE). A WPHE, or a liquid piston heat engine, can be used to convert the liquid or gas provided by the pump to a storage format. The WPHE can transform the input energy to a variety of energy storage formats. In embodiments, the WPHE sends energy to a pressure transformer amplifier 822. More than one pressure transformer amplifier may be coupled to the WPHE. As described throughout, the pressure transformer amplifier can include one or more pressure amplifier pipes such as pressure amplifier pipe 1 824 or pressure amplifier pipe 2 826. More than two pressure amplifier pipes can be connected to the pressure transformer amplifier. The one or more pressure transformer amplifier pipes can provide a high pressure 830 or a low pressure 832. Water pump/turbine energy can be stored in various other formats. In embodiments, the WPHE can send energy to storage via liquid energy transfer. The energy can be stored in a liquid format. Liquid energy transfer can be accomplished using a heat exchanger, a heat injector, a chiller, and so on. Liquid sources can include liquefied gases such as liquid air, ice, an ice-slurry, etc. One or more gases can receive energy through gaseous energy transfer. The WPHE can send energy to gaseous storage formats. The gaseous storage formats can include a vacuum, air, a gas, and so on. The gas can include a specialized gas such as Freon™ The WPHE can transform the energy that can be received from the water pump/turbine to energy for storage in a pressure amplifier, to liquid energy transfer, or to gaseous energy. The transfer can be accomplished using the mechanical energy of the water pump/turbine.

Figure 9:
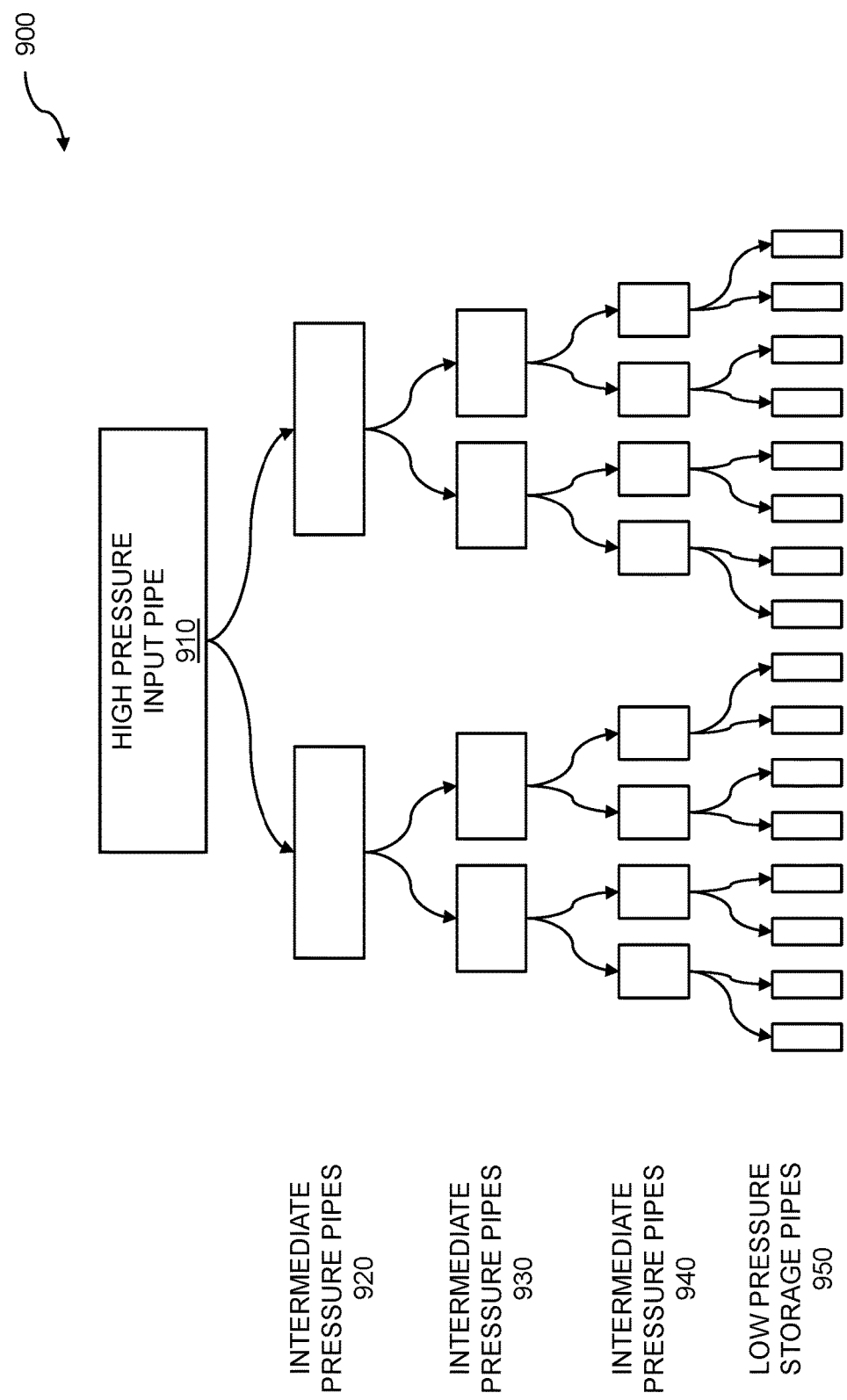
FIG. 9 shows piping for pressure storage in hierarchies.

FIG. 9 shows piping for pressure storage in hierarchies. A fluid-based local energy transfer distribution network can include energy storage and generation assemblies. Energy storage can be based on pressure storage using a pressure transformer amplifier. The pressure transformer amplifier can use two or more pressure amplification pipes to accomplish the pressure storage. Pressure storage enables energy transfer through fluid flows for energy management. Access to a fluid-based local energy transfer distribution network is obtained. One or more fluid-based energy storage and generation assemblies are connected to the fluid-based local energy transfer distribution network. Energy is provided to the one or more fluid-based energy storage and generation assemblies. Fluid-based energy is delivered from the energy storage and generation assemblies to the fluid-based local energy transfer distribution network, wherein the delivering is based on an energy control management system executing on one or more processors.

Pressure storage 900 can be accomplished using a hierarchy of pressure amplification pipes. Fluid, gas, or multiphase fluid and gas can be provided using a high-pressure input pipe 910. The high-pressure fluid, gas, etc., can be stored in a hierarchy of intermediate-pressure pipes. The intermediate-pressure pipes can include a first set of intermediate-pressure pipes 920, a second set of intermediate-pressure pipes 930, a third set of intermediate-pressure pipes 940, low-pressure storage pipes 950, and so on. While five levels of hierarchy, including the high-pressure input pipe, are shown, other levels of hierarchy can be used. The pressure of the fluid, liquid, etc., is reduced by the number of pipes when there are more intermediate-pressure pipes than input-pressure pipes. The amount of pressure change is dependent on the number of intermediate pipes, the relative sizes of the intermediate pipes, and so on. If there are a number of intermediate level pipes of equal dimensions to each other, the pressure of the input pipe is divided or partitioned evenly by the number intermediate pipes. Conversely, the pressure of the fluid, gas, etc. can be increased when a larger number of pipes are coupled to a smaller number of pipes.

In the example, the fluid, gas, etc., of the high-pressure input pipe is partitioned across the two pipes of the first set of intermediate-pressure pipes 920. The partitioning of the intermediate pressure within the first set of intermediate-pressure pipes 920 continues to further divide across the second set of intermediate-pressure pipes 930. This partitioning proceeds from a level of intermediate-pressure pipes to a next level of intermediate-pressure pipes. At the bottom of the pressure storage hierarchy, sixteen low-pressure storage pipes can each store one sixteenth ($1/16$) of the pressure within the high-pressure input pipe 910. When high pressure is once again required, the low pressure within the low-pressure storage pipes 950 can be recombined across the hierarchy of intermediate-pressure pipes. The recombining of the pressure in the low-pressure storage pipes across the hierarchy of intermediate-pressure pipes 940, 930, and 920 results in high pressure at the high-pressure input pipe 910.

Figure 10:
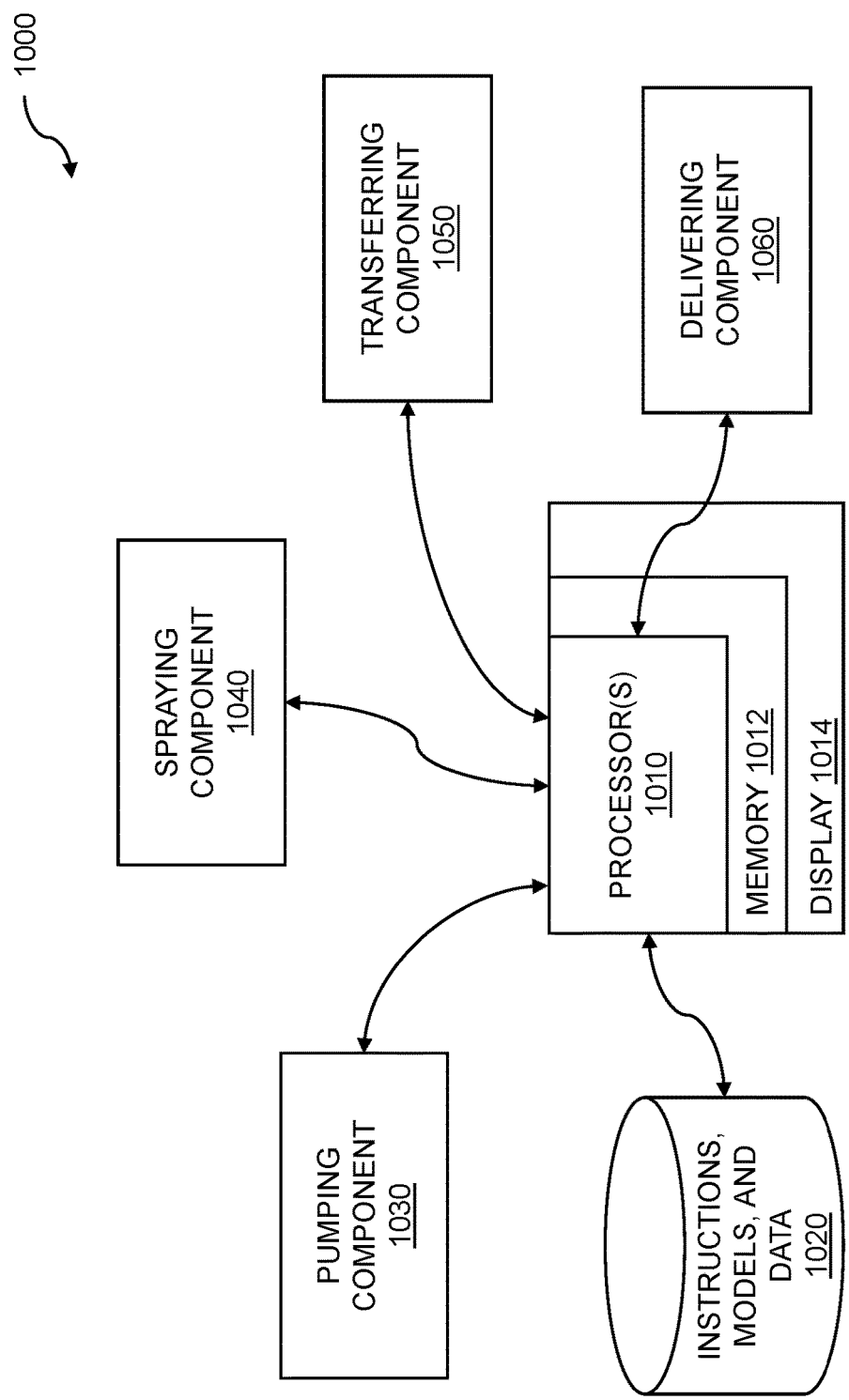
FIG. 10 is a system diagram for energy transfer using high-pressure vessels.

FIG. 10 is a system diagram for energy transfer using high-pressure vessels. Energy management is based on energy transfer using high-pressure vessels. Pumping of a liquid into a high-pressure vessel is controlled to accomplish pressurizing a gas. Liquid is sprayed into the high-pressure vessel to cool the gas. Heat exchange is performed to cool the liquid before spraying the liquid into the high-pressure vessel. The pressurized gas is provided into a storage reservoir. The storage reservoir comprises an underground cavern or aquifer. Gas is extracted from the storage reservoir to drive a turbine to recover stored energy. The extracting gas from the storage reservoir is accomplished using an additional high-pressure vessel. The extracted gas pushes a column of liquid within the additional high-pressure vessel. The column of liquid within the additional high-pressure vessel in turn drives the turbine to recover the stored energy. The system can be controlled to enable isothermal operation of one or high-pressure vessels. Isothermal operation can have an adiabicity of zero percent.

The system 1000 can include one or more processors 1010 and a memory 1012 which stores instructions. The memory 1012 is coupled to the one or more processors 1010, wherein the one or more processors 1010 can execute instructions stored in the memory 1012. The memory 1012 can be used for storing instructions; for storing databases of energy subsystems, modules, or peers for system support; and the like. Information regarding energy transfer using high-pressure vessels for energy management can be shown on a display 1014 connected to the one or more processors 1010. The display can comprise a television monitor, a projector, a computer monitor (including a laptop screen, a tablet screen, a netbook screen, and the like), a smartphone display, a mobile device, or another electronic display. The system 1000 includes instructions, models, and data 1020. The data can include information on energy sources, energy conversion requirements, metadata about energy, and the like. In embodiments, the instructions, models, and data 1020 are stored in a networked database, where the networked database can be a local database, a remote database, a distributed database, and so on. The instructions, models, and data 1020 can include instructions for obtaining access to one or more high-pressure vessels. The instructions, models, and data can further include operating data obtained from a plurality of fluid-based local energy transfer distribution networks, one or more operating goals for the plurality of fluid-based local energy transfer distribution networks, instructions for analyzing operating data, instructions for controlling the operation of energy storage and generation assemblies, etc. In embodiments, at least one of the one or more fluid-based energy storage and generation assemblies includes a pump running at an optimum performance-pressure point. An optimum performance-pressure point can be determined based on the design of the energy storage and generation assembly, on the past operation of the assembly, etc. Further embodiments include converting the pump optimum performance-pressure point pressure to a required pressure within the fluid-based local energy transfer distribution system using a pressure transformer amplifier.

The system 1000 includes a pumping component 1030. The pumping component 1030 can control pumping of a liquid into a high-pressure vessel to accomplish pressurizing a gas. The high-pressure vessel can be a component within a fluid-based local energy transfer distribution network. The fluid-based local energy transfer distribution network can be based on one fluid such as a homogeneous fluid. The homogeneous fluid can include more than one phase. In embodiments, the fluid-based local energy transfer distribution network can include a homogeneous fluid in liquid and gaseous phases. The fluid-based local energy transfer distribution network can be based more than one fluid. In embodiments, the fluid-based local energy transfer distribution network can include at least two heterogeneous fluids. The liquid or liquids can include a variety of liquids. In embodiments, the fluid-based energy comprises liquid air, where the liquid air can be supplied to the distribution network at a temperature less than $-215°$ C.

The system 1000 includes a spraying component 1040. The spraying component 1040 can spray liquid into the high-pressure vessel to cool the gas. In embodiments, the spraying liquid into the high-pressure vessel is accomplished on two opposing sides of the high-pressure vessel. The sides of the high-pressure can include any of the sides of the pressure vessel. In embodiments, the two opposing sides comprise a top and a bottom of the high-pressure vessel. The spraying can be accomplished using one or more orifices such as injectors. In embodiments, the spraying liquid into the top and the bottom of the high-pressure vessel is accomplished using nozzles in a top portion and nozzles in a bottom portion of the high-pressure vessel. In other embodiments, the liquid can be sprayed into the left side and the right side of the high-pressure vessel. While the spraying can be used to cool the gas during compression, the spraying can also be applied to heat the gas during expansion. The cooling or heating can be accomplished using a heat exchanger. Embodiments include performing heat exchange to warm the liquid before spraying the liquid into the additional high-pressure vessel. The system 1000 includes a transferring component 1050. The transferring component can provide the pressurized gas into a storage reservoir. The storage reservoir can include one or more ground level tanks, an underwater storage tank, vessel, or bladder, and so on. In embodiments, the storage reservoir comprises an underground cavern or aquifer. The storage reservoir can also include unused oil infrastructure such as unused oil wells.

The system 1000 includes a delivering component 1060. The delivering component can include extracting gas from the storage reservoir to deliver it to an energy recovery unit to recover stored work. The energy recovery unit can comprise a turbine. The extracted gas can be used to spin the turbine directly or can be captured. In embodiments, the extracting gas from the storage reservoir can be accomplished using an additional high-pressure vessel. The additional high-pressure vessel can include an on-ground vessel, and underwater vessel, etc. In embodiments, the extracted gas can push a column of liquid within the additional high-pressure vessel. The column of liquid can be used for energy recovery and generation. In embodiments, the column of liquid within the additional high-pressure vessel in turn drives the turbine to recover the stored energy. The column of liquid can be expelled from the additional high-pressure vessel by the pressurized gas. As the gas expands, the gas cools thereby risking frost buildup, freezing, etc., which could cause freeze up within the additional high-pressure vessel. Embodiments include spraying liquid into the additional high-pressure vessel. The liquid can be used to warm the gas and thereby avoid freeze up. Further embodiments include performing heat exchange to warm the liquid before spraying the liquid into the additional high-pressure vessel. The spraying can be accomplished at opposing sides of the high-pressure vessel. In embodiments, the spraying liquid into the additional high-pressure vessel is accomplished by spraying liquid into the top and the bottom of the additional high-pressure vessel using nozzles in a top portion and nozzles in a bottom portion of the additional high-pressure vessel. In other embodiments, the spraying liquid into the additional high-pressure vessel can be accomplished by spraying liquid into the left and the right of the additional high-pressure vessel using nozzles in a left portion and nozzles in a right portion of the additional high-pressure vessel. The spraying can be used to control an operating point within the high-pressure vessel. In embodiments, the spraying liquid into the additional high-pressure vessel allows substantially isothermal expansion of the gas within the additional high-pressure vessel.

The system 1000 can include a computer system for energy management comprising: a memory which stores instructions; one or more processors coupled to the memory wherein the one or more processors, when executing the instructions which are stored, are configured to: pump a first liquid into a high-pressure vessel, wherein the pumping is controlled to accomplish pressurizing a gas contained in the high-pressure vessel; spray a second liquid into the high-pressure vessel, wherein the spraying a second liquid is used to cool the gas that is pressurized; transfer the pressurized gas from the high-pressure vessel to a storage reservoir, wherein the storage reservoir is isolatable from the high-pressure vessel; and deliver the pressurized gas from the storage reservoir to an energy recovery unit to extract work from the pressurized gas. Disclosed embodiments can include a computer program product embodied in a non-transitory computer readable medium for energy management, the computer program product comprising code which causes one or more processors to perform operations of: pumping a first liquid into a high-pressure vessel, wherein the pumping is controlled to accomplish pressurizing a gas contained in the high-pressure vessel; spraying a second liquid into the high-pressure vessel, wherein the spraying a second liquid is used to cool the gas that is pressurized; transferring the pressurized gas from the high-pressure vessel to a storage reservoir, wherein the storage reservoir is isolatable from the high-pressure vessel; and delivering the pressurized gas from the storage reservoir to an energy recovery unit to extract work from the pressurized gas.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for energy management comprising:
    pumping a first liquid into a high-pressure vessel, wherein the pumping is controlled to accomplish pressurizing a gas contained in the high-pressure vessel;
    spraying a second liquid into the high-pressure vessel, wherein the spraying a second liquid is used to cool the gas that is pressurized, wherein the spraying uses two sprays on a top side and a bottom side of the high-pressure vessel;

transferring the pressurized gas from the high-pressure vessel to a storage reservoir, wherein the storage reservoir is isolatable from the high-pressure vessel; and delivering the pressurized gas from the storage reservoir to an energy recovery unit to extract work from the pressurized gas, wherein storage and recovery of energy is performed via a software-defined water piston heat engine (WPHE).

2. The method of claim 1 wherein the pressurizing a gas is accomplished isothermally.

3. The method of claim 1 wherein the spraying a second liquid into the high-pressure vessel is accomplished using nozzles in the high-pressure vessel.

4. The method of claim 1 wherein an amount of the second liquid that is sprayed into the high-pressure vessel is increased as pressure within the high-pressure vessel increases.

5. The method of claim 1 wherein the pumping a first liquid into the high-pressure vessel directs the gas to a desired point in the high-pressure vessel.

6. The method of claim 5 wherein the gas directed to a desired point in the high-pressure vessel can be transferred from the high-pressure vessel by opening a valve.

7. The method of claim 1 wherein the pumping of the second liquid into the high-pressure vessel is accomplished by direct liquid injection.

8. The method of claim 1 further comprising cooling the second liquid before spraying the second liquid into the high-pressure vessel.

9. The method of claim 1 wherein the delivering the pressurized gas from the storage reservoir to the energy recovery unit includes expanding the pressurized gas in an additional high-pressure vessel.

10. The method of claim 9 wherein the expanding the pressurized gas forces a column of a third liquid out of the additional high-pressure vessel.

11. The method of claim 10 wherein the third liquid that is forced out of the additional high-pressure vessel in turn drives a turbine to recover stored energy.

12. The method of claim 10 further comprising spraying a fourth liquid into the additional high-pressure vessel during the expanding.

13. The method of claim 12 further comprising warming, via heat exchange, the fourth liquid before spraying the fourth liquid into the additional high-pressure vessel.

14. The method of claim 12 wherein the spraying a fourth liquid into the additional high-pressure vessel is accomplished by spraying liquid into the top of the additional high-pressure vessel and the bottom of the additional high-pressure vessel by using nozzles in a top portion of the additional high-pressure vessel and nozzles in a bottom portion of the additional high-pressure vessel, respectively.

15. The method of claim 12 wherein the spraying a fourth liquid into the additional high-pressure vessel allows substantially isothermal expansion of the pressurized gas within the additional high-pressure vessel.

16. The method of claim 12 wherein the third liquid and the fourth liquid are of a same composition.

17. The method of claim 1 wherein the first liquid and the second liquid are of a same composition.

18. The method of claim 17 wherein the first liquid and the second liquid both comprise water.

19. The method of claim 1 wherein the storage reservoir comprises an underground cavity.

20. The method of claim 1 wherein the pumping a first liquid into a high-pressure vessel comprises a liquid piston, wherein the liquid piston comprises a column of liquid that meets with the gas at an interface.

21. The method of claim 1 wherein the energy recovery unit includes a turbine driven by the pressurized gas.

22. The method of claim 14 wherein the fourth liquid comprises liquid nitrogen.

23. The method of claim 1 further comprising increasing the amount of the second liquid that is sprayed as pressure within the high-pressure vessel increases.

24. A computer program product embodied in a non-transitory computer readable medium for energy management, the computer program product comprising code which causes one or more processors to perform operations of:

pumping a first liquid into a high-pressure vessel, wherein the pumping is controlled to accomplish pressurizing a gas contained in the high-pressure vessel;

spraying a second liquid into the high-pressure vessel, wherein the spraying a second liquid is used to cool the gas that is pressurized, wherein the spraying uses two sprays on a top side and a bottom side of the high-pressure vessel;

transferring the pressurized gas from the high-pressure vessel to a storage reservoir, wherein the storage reservoir is isolatable from the high-pressure vessel; and delivering the pressurized gas from the storage reservoir to an energy recovery unit to extract work from the pressurized gas, wherein storage and recovery of energy is performed via a software-defined water piston heat engine (WPHE).

25. A computer system for energy management comprising:

a memory which stores instructions;

one or more processors coupled to the memory wherein the one or more processors, when executing the instructions which are stored, are configured to:

pump a first liquid into a high-pressure vessel, wherein the pumping is controlled to accomplish pressurizing a gas contained in the high-pressure vessel;

spray a second liquid into the high-pressure vessel, wherein the spraying a second liquid is used to cool the gas that is pressurized, wherein the spraying uses two sprays on a top side and a bottom side of the high-pressure vessel;

transfer the pressurized gas from the high-pressure vessel to a storage reservoir, wherein the storage reservoir is isolatable from the high-pressure vessel; and deliver the pressurized gas from the storage reservoir to an energy recovery unit to extract work from the pressurized gas, wherein storage and recovery of energy is performed via a software-defined water piston heat engine (WPHE).

* * * * *